US012666044B2

(12) United States Patent
Rama Aditya et al.

(10) Patent No.: US 12,666,044 B2
(45) Date of Patent: Jun. 23, 2026

(54) SYSTEMS AND METHODS OF PROCESSING IMAGE DATA FROM AN ENTROPY DECODER

(71) Applicant: QUALCOMM Incorporated, San Diego, CA (US)

(72) Inventors: Garimella Rama Aditya, Hyderabad (IN); Krishna Murthy, Bengaluru (IN); Sandeep Nellikatte Srivatsa, Bangalore (IN); Ashish Mishra, Bhubaneswar (IN)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 18/946,538

(22) Filed: Nov. 13, 2024

(65) Prior Publication Data

US 2026/0136017 A1    May 14, 2026

(51) Int. Cl.
| | |
|---|---|
| *H04N 19/156* | (2014.01) |
| *H04N 9/78* | (2006.01) |
| *H04N 19/127* | (2014.01) |
| *H04N 19/186* | (2014.01) |
| *H04N 19/91* | (2014.01) |

(52) U.S. Cl.
CPC ............. *H04N 19/156* (2014.11); *H04N 9/78* (2013.01); *H04N 19/127* (2014.11); *H04N 19/186* (2014.11); *H04N 19/91* (2014.11)

(58) Field of Classification Search
CPC ...... H04N 19/156; H04N 9/78; H04N 19/127; H04N 19/186; H04N 19/91

USPC ...................................................... 375/240.26
See application file for complete search history.

(56) References Cited

U.S. PATENT DOCUMENTS

| | | | | |
|---|---|---|---|---|
| 9,807,401 | B2 * | 10/2017 | Wang .................. | H04N 19/122 |
| 10,499,052 | B2 * | 12/2019 | Gamei ................ | H04N 19/103 |
| 2013/0101037 | A1 * | 4/2013 | Chono .................. | H04N 19/12 |
| | | | | 375/240.18 |
| 2015/0092862 | A1 * | 4/2015 | Yu ........................ | H04N 19/503 |
| | | | | 375/240.18 |
| 2020/0413059 | A1 * | 12/2020 | Han ..................... | H04N 19/176 |

* cited by examiner

*Primary Examiner* — Asmamaw G Tarko
(74) *Attorney, Agent, or Firm* — QUALCOMM Incorporated; Espartaco Diaz Hidalgo

(57) ABSTRACT

A device includes a memory and one or more processors. The memory is configured to store image data associated with a logical unit of an image frame. The logical unit includes at least a luma transform unit (TU) and at least a chroma TU. The one or more processors are configured to determine, at a pixel processor, whether the luma TU from an entropy decoder is available. The one or more processors are also configured to determine, at the pixel processor, whether the chroma TU from the entropy decoder is available. The one or more processors are further configured to, based on a determination that the chroma TU is available and that the luma TU is unavailable, process, at the pixel processor, the chroma TU to generate chroma pixel values of the logical unit prior to processing the luma TU to generate luma pixel values of the logical unit.

20 Claims, 11 Drawing Sheets

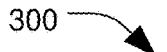
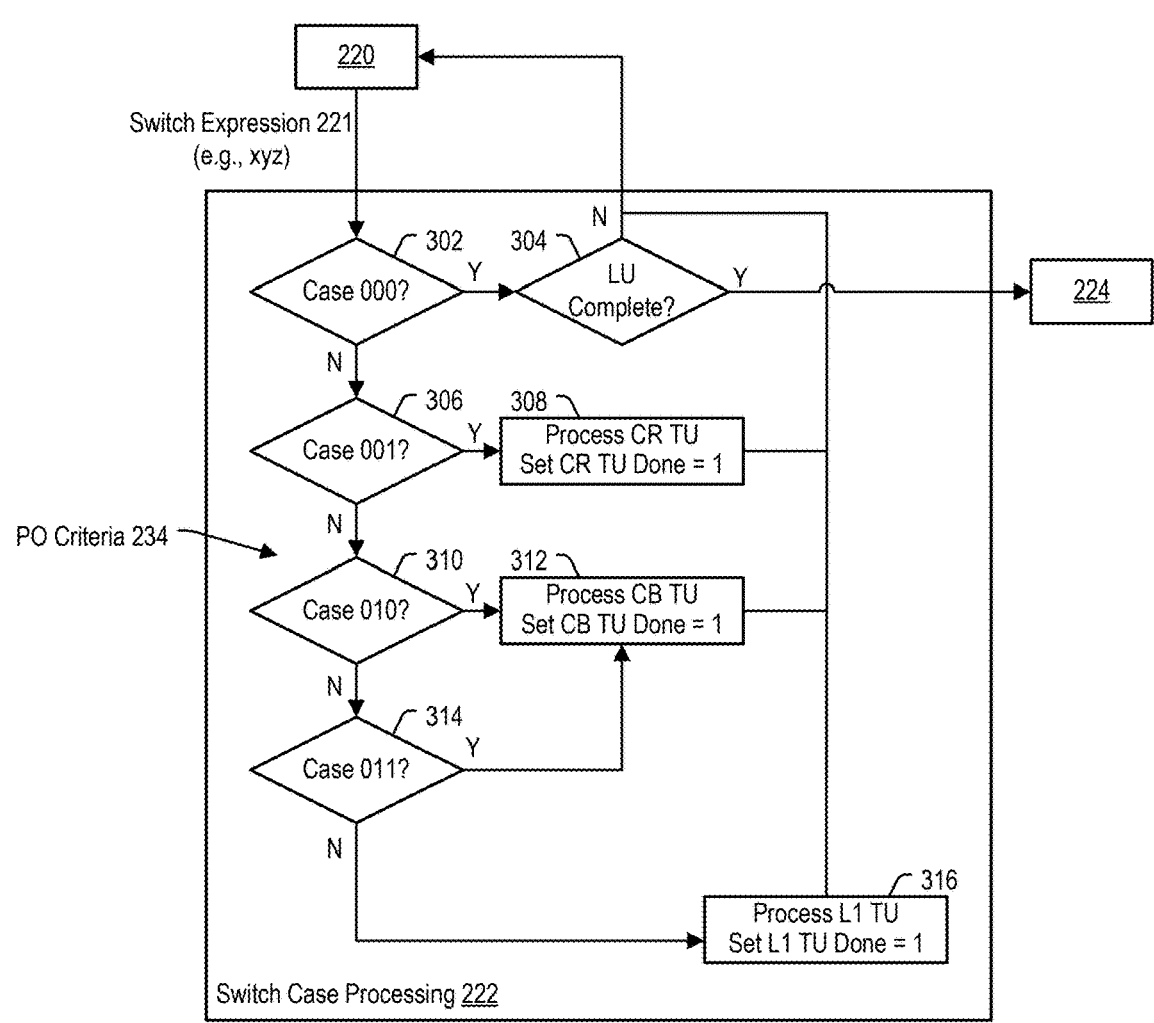
FIG. 3

600 —

700 —

1100

140

1102

1200

1202

1204

140

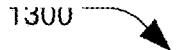
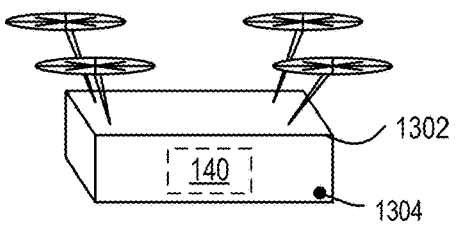
FIG. 13
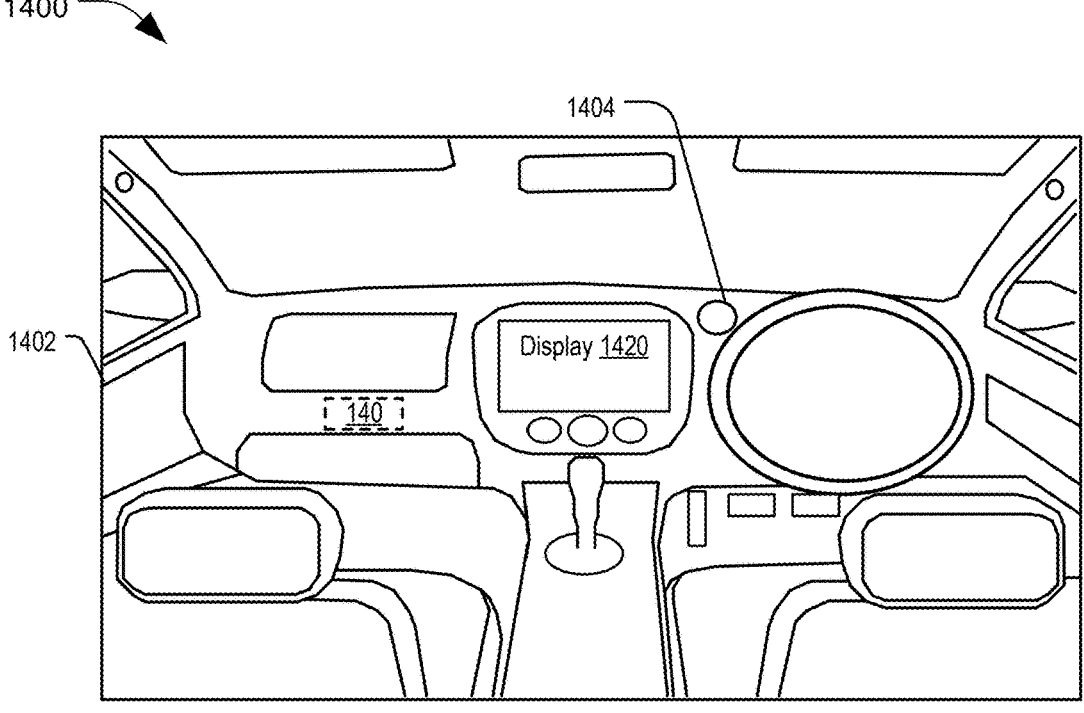
FIG. 14

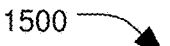

1500

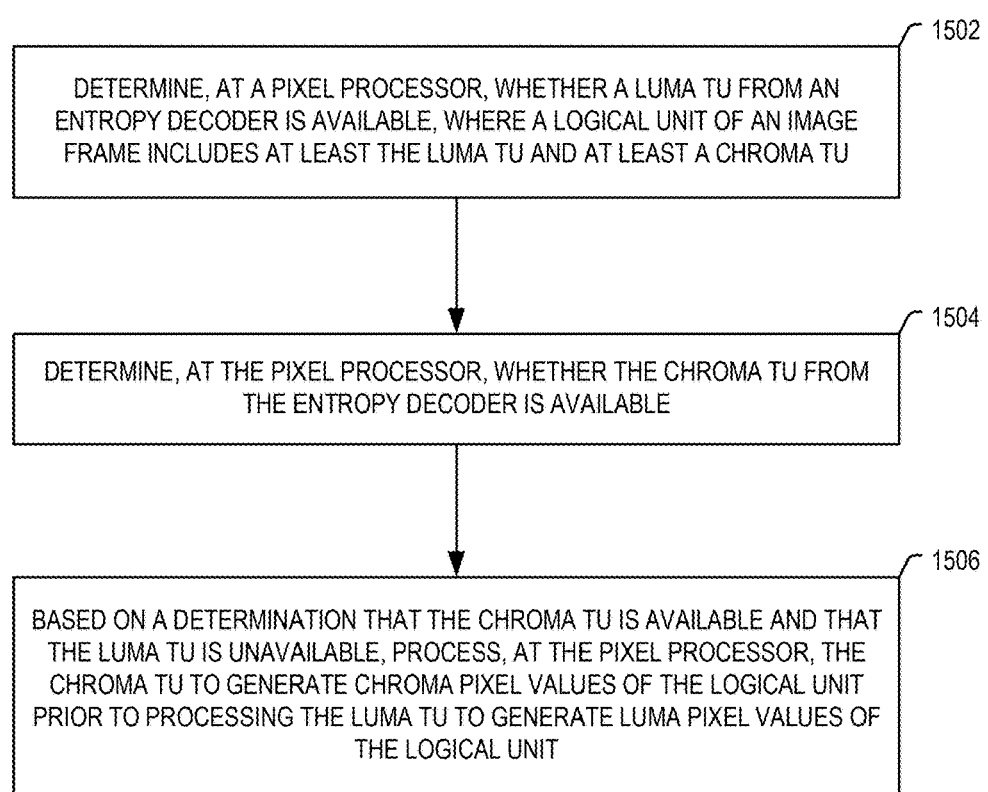

1502

DETERMINE, AT A PIXEL PROCESSOR, WHETHER A LUMA TU FROM AN ENTROPY DECODER IS AVAILABLE, WHERE A LOGICAL UNIT OF AN IMAGE FRAME INCLUDES AT LEAST THE LUMA TU AND AT LEAST A CHROMA TU

1504

DETERMINE, AT THE PIXEL PROCESSOR, WHETHER THE CHROMA TU FROM THE ENTROPY DECODER IS AVAILABLE

1506

BASED ON A DETERMINATION THAT THE CHROMA TU IS AVAILABLE AND THAT THE LUMA TU IS UNAVAILABLE, PROCESS, AT THE PIXEL PROCESSOR, THE CHROMA TU TO GENERATE CHROMA PIXEL VALUES OF THE LOGICAL UNIT PRIOR TO PROCESSING THE LUMA TU TO GENERATE LUMA PIXEL VALUES OF THE LOGICAL UNIT

*FIG. 15*

SYSTEMS AND METHODS OF PROCESSING IMAGE DATA FROM AN ENTROPY DECODER

I. FIELD

The present disclosure is generally related to image decoding.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive a video signal from a video camera. For example, the video signal may represent a sequence of image frames. A pixel processor processes an input image frame to generate image data that is processed by an entropy encoder to generate bitstream data. The bitstream data can be transmitted to another device. An entropy decoder decodes the bitstream data to generate image data that is processed by a pixel processor to generate an output image frame. The output image frame is a reproduction of the input image frame. Processing of an image frame by a pixel processor can take a different duration than processing of image data by an entropy decoder. Image data between a pixel processor and an entropy decoder is buffered to decouple the processing speeds of the pixel processor and the entropy decoder. For example, image data generated by the entropy decoder is buffered in memory for retrieval by the pixel processor.

An image frame can be divided into a plurality of logical units for encoding. Typically, a logical unit includes two luma transform units (TUs) and two chroma TUs, and the pixel processor processes both of the luma TUs prior to processing the chroma TUs to generate reconstructed pixel values of the logical unit. Waiting for both of the luma TUs to be received from the entropy decoder prior to processing the chroma TUs increases reconstruction latency associated with the logical unit when at least one of the chroma TUs is available prior to at least one of the luma TUs.

III. SUMMARY

According to one implementation of the present disclosure, a device includes a memory configured to store image data associated with a logical unit of an image frame. The logical unit includes at least a luma transform unit (TU) and at least a chroma TU. The device also includes one or more processors coupled to the memory. The one or more processors are configured to determine, at a pixel processor, whether the luma TU from an entropy decoder is available. The one or more processors are also configured to determine, at the pixel processor, whether the chroma TU from the entropy decoder is available. The one or more processors are further configured to, based on a determination that the chroma TU is available and that the luma TU is unavailable, process, at the pixel processor, the chroma TU to generate chroma pixel values of the logical unit prior to processing the luma TU to generate luma pixel values of the logical unit.

According to another implementation of the present disclosure, a method includes determining, at a pixel processor, whether a luma transform unit (TU) from an entropy decoder is available. A logical unit of an image frame includes at least the luma TU and at least a chroma TU. The method also includes determining, at the pixel processor, whether the chroma TU from the entropy decoder is available. The method also includes, based on a determination that the chroma TU is available and that the luma TU is unavailable, processing, at the pixel processor, the chroma TU to generate chroma pixel values of the logical unit prior to processing the luma TU to generate luma pixel values of the logical unit.

According to another implementation of the present disclosure, a non-transitory computer-readable medium includes instructions that, when executed by one or more processors, cause the one or more processors to determine, at a pixel processor, whether a luma transform unit (TU) from an entropy decoder is available. A logical unit of an image frame includes at least the luma TU and at least a chroma TU. The instructions also cause the one or more processors to determine, at the pixel processor, whether the chroma TU from the entropy decoder is available. The instructions further cause the one or more processors to, based on a determination that the chroma TU is available and that the luma TU is unavailable, process, at the pixel processor, the chroma TU to generate chroma pixel values of the logical unit prior to processing the luma TU to generate luma pixel values of the logical unit.

According to another implementation of the present disclosure, an apparatus includes means for determining whether a luma transform unit (TU) from an entropy decoder is available. A logical unit of an image frame includes at least the luma TU and at least a chroma TU. The apparatus also includes means for determining whether the chroma TU from the entropy decoder is available. The apparatus includes means for processing the chroma TU to generate chroma pixel values of the logical unit prior to processing the luma TU to generate luma pixel values of the logical unit, the chroma TU processed based on a determination that the chroma TU is available and that the luma TU is unavailable.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 3 is a diagram of a particular implementation of a method of processing image data from an entropy decoder, in accordance with some examples of the present disclosure.

FIG. 13 is a diagram of a first example of a vehicle operable to process image data from an entropy decoder, in accordance with some examples of the present disclosure.

FIG. 14 is a diagram of a second example of a vehicle operable to process image data from an entropy decoder, in accordance with some examples of the present disclosure.

FIG. 15 is a diagram of a particular implementation of a method of processing image data from an entropy decoder that may be performed by the system of FIG. 1, in accordance with some examples of the present disclosure.

V. DETAILED DESCRIPTION

An entropy decoder decodes a bitstream to generate transform units (TUs) of a logical unit of an image frame and a pixel processor processes the TUs to generate reconstructed pixel values of the image frame. Typically, a logical unit includes two luma TUs and two chroma TUs, and the pixel processor processes both of the luma TUs prior to processing the chroma TUs to generate reconstructed pixel values of the logical unit. Even if each TU is of the same size, processing of different TUs can take different durations at the entropy decoder whereas processing of different TUs typically takes a similar duration at the pixel processor. Additionally, in some examples, the chroma TUs and the luma TUs can be processed concurrently at the entropy decoder. For at least these reasons, subsequent to processing of a first luma TU at the pixel processor, a first chroma TU can be available from the entropy decoder prior to a second luma TU being available from the entropy decoder, as further described with reference to FIGS. 4-5. Waiting for both of the luma TUs to be received from the entropy decoder prior to processing the chroma TUs increases reconstruction latency associated with the logical unit when at least one of the chroma TUs is available prior to at least one of the luma TUs.

Systems and methods of processing image data from an entropy decoder are disclosed. For example, a logical unit (LU) of an image frame includes at least a luma TU and at least a chroma TU. A pixel processor determines whether the luma TU from the entropy decoder is available. The pixel processor also determines whether the chroma TU from the entropy decoder is available. The pixel processor, based on determining that the chroma TU is available and that the luma TU is unavailable, processes the chroma TU to generate chroma pixel values of the LU. Subsequently, when the luma TU from the entropy decoder is available, the pixel processor processes the luma TU to generate luma pixel values of the LU. The pixel processor generates pixel values of the LU based on the chroma pixel values and the luma pixel values. A technical advantage of generating the chroma pixel values without waiting for the luma TU to be received includes reduced reconstruction latency of the LU.

Figure 1:
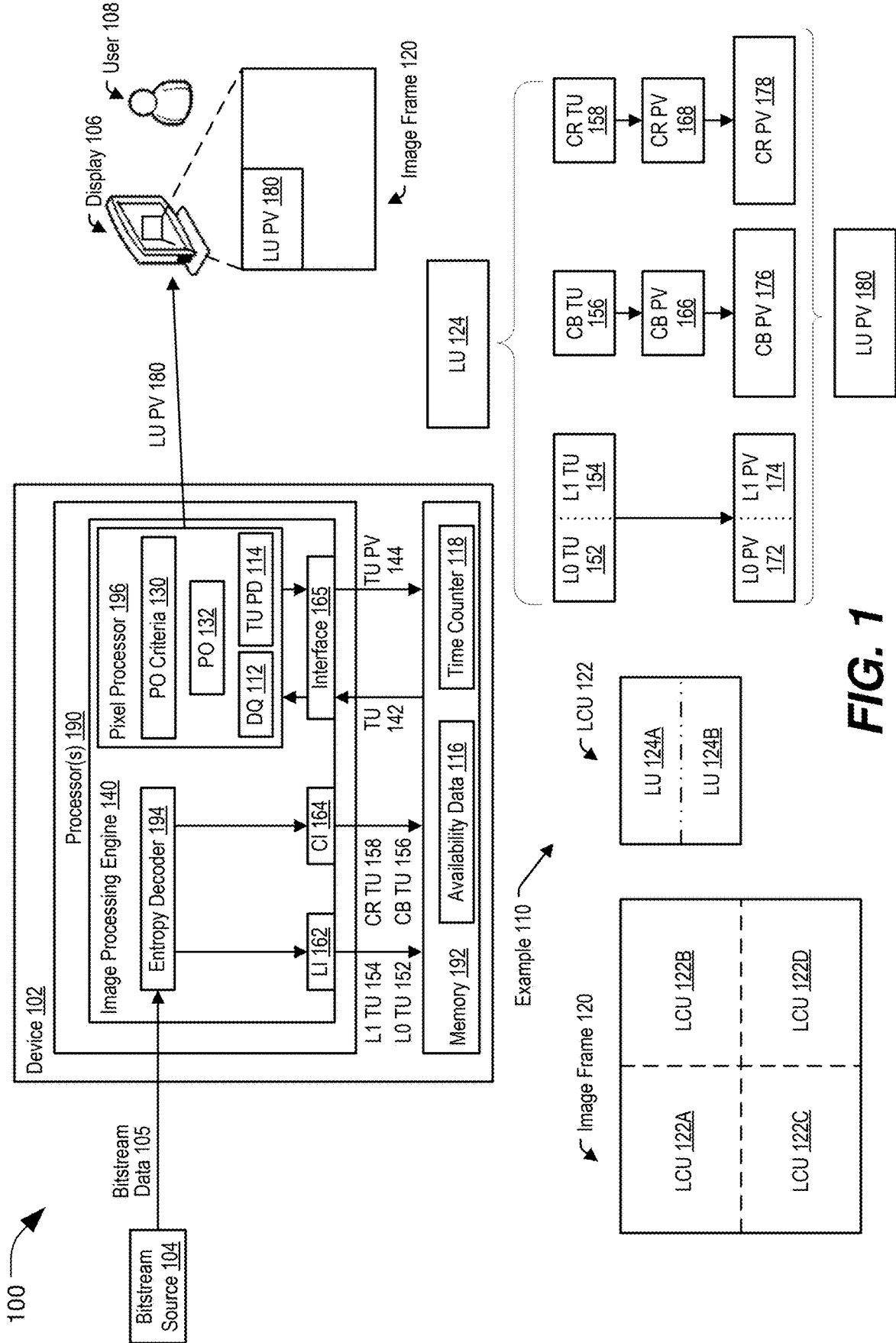
FIG. 1 is a block diagram of a particular illustrative aspect of a system operable to process image data from an entropy decoder, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple logical units are illustrated and associated with reference numbers 124A and 124B. When referring to a particular one of these logical units, such as a logical unit 124A, the distinguishing letter "A" is used. However, when referring to any arbitrary one of these logical units or to these logical units as a group, the reference number 124 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/ or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to process image data from an entropy decoder is disclosed and generally designated 100. The system 100 includes a device 102 that is coupled to a bitstream source 104 and to a display device 106. Although each of the bitstream source 104 and the display device 106 is illustrated as external to the device 102, in some other examples the bitstream source 104, the display device 106, or both, are integrated in the device 102.

The device 102 includes one or more processors 190 coupled to a memory 192. The one or more processors 190 include an image processing engine 140 that includes an entropy decoder 194 and a pixel processor 196. Optionally, in some embodiments, the image processing engine 140 includes one or more interfaces to enable communication between the entropy decoder 194 and the pixel processor 196. In an example, the image processing engine 140 includes a luma interface (LI) 162, a chroma interface (CI) 164, and an interface 165. The entropy decoder 194 is coupled via each of the LI 162 and the CI 164 to the memory 192. The memory 192 is coupled via the interface 165 to the pixel processor 196.

The entropy decoder 194 is configured to exchange luma data via the LI 162 with the memory 192 and to exchange chroma data via the CI 164 with the memory 192. For example, in some embodiments, the entropy decoder 194 can concurrently exchange luma data via the LI 162 with the memory 192 while exchanging chroma data via the CI 164 with the memory 192. In some examples, the LI 162 corresponds to a first communication channel and the CI 164 corresponds to a second communication channel. Optionally, in some embodiments, the LI 162 and the CI 164 are combined into a single interface. Optionally, in some embodiments, the LI 162 includes one or more luma interfaces, and the CI 164 includes one or more chroma interfaces.

The pixel processor 196 is configured to exchange data (e.g., luma data, chroma data, pixel data, etc.) via the interface 165 with the memory 192. Optionally, in some embodiments, the interface 165 includes one or more dedicated luma interfaces, one or more dedicated chroma interfaces, and one or more dedicated pixel data interfaces. In some examples, the LI 162 and the one or more dedicated luma interface together correspond to an entropy decoder-to-pixel processor (E2P) luma interface, and the CI 164 and the one or more dedicated chroma interfaces together correspond to an E2P chroma interface.

It should be understood that the memory 192 external to the image processing engine 140 is provided as an illustrative example, in some other examples a first portion of the memory 192 can be integrated in the entropy decoder 194, a second portion of the memory 192 can be integrated in the pixel processor 196, or both.

The memory 192 is configured to store image data associated with an LU 124 of an image frame 120. The memory 192 is also configured to store availability data 116 of the logical unit 124. The availability data 116 indicates whether TUs of the logical unit 124 are available. For example, the availability data 116 includes a received indicator and a processed indicator corresponding to each TU of the LU 124. A first value (e.g., 0) of the received indicator indicates that a corresponding TU has not been received from the entropy decoder 194. Alternatively, a second value (e.g., 1) of the received indicator indicates that the corresponding TU has been received. A first value (e.g., 0) of the processed indicator indicates that a corresponding TU has not been processed by the pixel processor 196. Alternatively, a second value (e.g., 1) of the processed indicator indicates that the corresponding TU has been processed by the pixel processor 196. A TU that has been received from the entropy decoder 194 and has not been processed by the pixel processor 196 is considered available for processing by the pixel processor 196.

The image processing engine 140 is configured to obtain bitstream data 105 from a bitstream source 104. Optionally, in some implementations, the bitstream source 104 includes an image sensor (e.g., a still camera, a video camera, or both), a user device, a communication device, a network device, a storage device, the memory 192, the one or more processors 190, or a combination thereof.

In a particular aspect, the bitstream source 104 includes a source pixel processor and a source entropy encoder. In some embodiments, the source pixel processor includes at least one of a prediction engine, a transform engine, or a filter engine. The source pixel processor is configured to process an image frame 120 to generate image data. The source entropy encoder is configured to process the image data to generate the bitstream data 105.

The entropy decoder 194 is configured to process the bitstream data 105 to generate image data and to store the image data in the memory 192. The pixel processor 196 is configured to retrieve image data from the memory 192 and to process the image data to generate a reconstructed version of the image frame 120.

In some implementations, the device 102 corresponds to or is included in one of various types of devices. In an illustrative example, the one or more processors 190 are integrated in at least one of a mobile phone or a tablet computer device, as described with reference to FIG. 7, a wearable electronic device, as described with reference to FIG. 8, augmented reality or mixed reality glasses, as described with reference to FIG. 9, a voice-controlled speaker system, as described with reference to FIG. 10, a camera device, as described with reference to FIG. 11, or a virtual reality, mixed reality, or augmented reality headset, as described with reference to FIG. 12. In another illustrative example, the one or more processors 190 are integrated into a vehicle, such as described further with reference to FIG. 13 and FIG. 14.

During operation, the bitstream source 104 provides bitstream data 105 representing at least a portion of an image frame 120 to the image processing engine 140. In an example 110, the image frame 120 corresponds to (e.g., is divided into) a plurality of logical coding units (LCUs) 122. To illustrate, the image frame 120 includes an LCU 122A, an LCU 122B, an LCU 122C, an LCU 122D, one or more additional LCUs, or a combination thereof. Each LCU 122 includes a plurality of logical units 124. For example, an LCU 122 includes an LU 124A, an LU 124B, one or more additional LUs, or a combination thereof.

Each LU 124 includes at least a respective luma TU and at least a respective chroma TU. Optionally, in some implementations, the source pixel processor generates TUs of each LU for encoding by the source entropy encoder. For example, the source pixel processor performs pixel processing operations (e.g., prediction, transformation, filtering, compression, etc.) to generate at least one luma TU and at least one chroma TU of an LU 124. To illustrate, the source pixel processor generates a first luma (L0) TU 152 and a second luma (L1) TU 154 of the LU 124 and generates a first chroma (CB) TU 156 and a second chroma (CR) TU 158 of the LU 124.

In a particular aspect, the L0 TU 152 represents luma information of a first portion (e.g., a left half) of the LU 124 and the L1 TU 154 represents luma information of a second portion (e.g., a right half) of the LU 124. In some implementations, the L0 TU 152 corresponds to a luma TU of the LU 124 that is generated first at the entropy decoder 194 and the L1 TU 154 corresponds to another luma TU of the LU 124 that is generated subsequently at the entropy decoder 194. For example, for a first LU 124, the L0 TU 152 can correspond to a left luma portion of the LU 124 and the L1 TU 154 can correspond to a right luma portion of the LU 124, and for another LU 124, the L0 TU 152 can correspond to a right luma portion of the LU 124 and the L1 TU 154 can correspond to a left luma portion of the LU 124.

In a particular aspect, the CB TU 156 represents a first type of chroma information (e.g., blue-difference chroma) of the LU 124 and the CR TU 158 represents a second type of chroma information (e.g., red-difference chroma) of the LU 124. Optionally, in some implementations, the CB TU 156 represents the first type of chroma information of a down-sampled version of the LU 124 and the CR TU 158 represents the second type of chroma information of the down-sampled version of the LU 124.

The source entropy encoder performs entropy encoding operations on the L0 TU 152, the L1 TU 154, the CB TU 156, the CR TU 158, or a combination thereof, to generate the bitstream data 105 (e.g., syntax data, coefficient data, header data, or a combination thereof) that is provided as a bitstream to the image processing engine 140. In a particular aspect, a TU corresponds to quantized transform coefficients that are encoded by the source entropy encoder.

It should be understood that the LU 124A representing a top half of the LCU 122 and the LU 124B representing a bottom half of the LCU 122 is provided as an illustrative example. In some other examples, the LU 124A and the LU 124B can represent various portions of the LCU 122, such as the LU 124A can represent a left half of the LCU 122 and the LU 124V can represent a right half of the LCU 122. It should be understood that the L0 TU 152 representing a left half of the LU 124 and the L1 TU 154 representing a right half of the LU 124 is provided as an illustrative example. In some other examples, the L0 TU 152 and the L0 TU 154 can represent various portions of the LU 124, such as the L0 TU 152 can represent a top half of the LU 124 and the L1 TU 154 can represent a bottom half of the LU 124.

It should be understood that an LCU 122 corresponding to two LUs 124 is provided as an illustrative example, in other examples the LCU 122 can include a single LU 124 or more than two LUs 124. It should be understood that an LU corresponding to two luma TUs and two chroma TUs is provided as an illustrative example, and in other examples an LU 124 can include more than two luma TUs, a single chroma TU or more than two chroma TUs, or a combination thereof.

Optionally, in some implementations, the image processing engine 140 (e.g., the entropy decoder 194) initializes a time counter 118 corresponding to the image frame 120. For example, the time counter 118 indicates a first time at which at least a portion of bitstream data 105 corresponding to the image frame 120 is received at the image processing engine 140.

The entropy decoder 194 performs entropy decoding operations (e.g., reconstruction, prediction, etc.) on the bitstream data 105 to generate image data. For example, the entropy decoder 194 processes the bitstream data 105 to generate a reconstructed version of a TU 142 (e.g., the L0 TU 152, the L1 TU 154, the CB TU 156, or the CR TU 158). The entropy decoder 194 outputs luma TUs (e.g., the L0 TU 152 and the L1 TU 154) via the L1 162 to the memory 192 concurrently with outputting chroma TUs (e.g., the CB TU 156 and the CR TU 158) via the CI 164 to the memory 192.

In an example, the entropy decoder 194 outputs a TU 142 (e.g., the L0 TU 152, the L1 TU 154, the CB TU 156, or the CR TU 158) via a corresponding interface (e.g., the L1 162 or the CI 164) to the memory 192. The image processing engine 140 (e.g., the entropy decoder 194) updates availability data 116 in the memory 192 to indicate that the TU 142 of the LU 124 is available. For example, the availability data 116 includes a received indicator and a processed indicator associated with the TU 142 of the LU 124 and the image processing engine 140, in response to receipt of the TU 142 at the memory 192 from the entropy decoder 194, sets the received indicator to the second value (e.g., 1) indicating that the TU 142 has been output from the entropy decoder 194 and sets the processed indicator to the first value (e.g., 0) indicating that the TU 142 has not been processed at the pixel processor 196.

In an illustrative example, the availability data 116 includes a received indicator and a processed indicator associated with the L0 TU 152 and the image processing engine 140, in response to receipt of the L0 TU 152 at the memory 192 via the L1 162 from the entropy decoder 194, sets the received indicator to the second value (e.g., 1)

indicating that the L0 TU 152 has been output from the entropy decoder 194 and sets the processed indicator to the first value (e.g., 0) indicating that the L0 TU 152 has not been processed at the pixel processor 196. In another illustrative example, the availability data 116 includes a received indicator and a processed indicator associated with the CB TU 156 and the image processing engine 140, in response to receipt of the CB TU 156 at the memory 192 via the CI 164 from the entropy decoder 194, sets the received indicator to the second value (e.g., 1) indicating that the CB TU 156 has been output from the entropy decoder 194 and sets the processed indicator to the first value (e.g., 0) indicating that the CB TU 156 has not been processed at the pixel processor 196.

The pixel processor 196 determines, based on the availability data 116 and processing order (PO) criteria 130, a processing order 132 of the TUs of the LU 124 at the pixel processor 196, as further described with reference to FIGS. 2-5. In an example, the pixel processor 196, based on a value of a received indicator corresponding to a TU 142 (e.g., the L0 TU 152, the L1 TU 154, the CB TU 156, or the CR TU 158), determines whether the TU 142 has been output from the entropy decoder 194. The pixel processor 196, based on a value of the processed indicator corresponding to the TU 142, determines whether the TU 142 has been processed at the pixel processor 196. The pixel processor 196, based on determining that the TU 142 has been output from the entropy decoder 194 and that the TU 142 has not been processed at the pixel processor 196, determines that the TU 142 is available.

Optionally, in some implementations, the processing order criteria 130 indicate that the TUs of a LU 124 can be processed in any order. For example, the pixel processor 196, in response to determining that a TU 142 of the LU 124 is available and that the processing order criteria 130 indicate that TUs can be processed in any order, determines that the TU 142 can be processed next in the processing order 132 independently of whether the TU 142 corresponds to a luma TU or a chroma TU.

Optionally, in some other implementations, the processing order criteria 130 indicate that a luma TU of a LU 124 is to be processed prior to remaining TUs of a LU 124. For example, the pixel processor 196, in response to determining that a L0 TU 152 of a LU 124 is available and that the processing order criteria 130 indicate that a luma TU is to be processed to initialize processing of a LU 124, determines that the L0 TU 152 can be processed next in the processing order 132 prior to processing the remaining TUs (e.g., the L1 TU 154, the CB TU 156, or the CR TU 158) of the LU 124. As another example, the pixel processor 196, in response to determining that a CB TU 156 of a LU 124 is available, that the L0 TU 152 of the LU 124 has been processed in the processing order 132, and that the processing order criteria 130 indicate that the remaining TUs (e.g., including a CB TU) can be processed subsequent to processing of the L0 TU 152, determines that the CB TU 156 can be processed next in the processing order 132 subsequent to processing of the L0 TU 152. In a particular aspect, the processing order criteria 130 are based on a configuration setting, default data, user input, or a combination thereof.

In an illustrative example, the pixel processor 196, in response to determining that the availability data 116 indicates that a TU 142 (e.g., the L0 TU 152, the L1 TU 154, the CB TU 156, or the CR TU 158) is available and that the processing order criteria 130 indicate that the TU 142 can be processed next in the processing order 132, retrieves the TU

142 via the interface 165 from the memory 192 and processes the TU 142 to generate TU pixel values (PV) 144.

In some implementations, the TU 142 corresponds to quantized transform coefficients. For example, the bitstream source 104 (e.g., a camera) provides a representation (e.g., an encoded representation) of the TU 142 as the bitstream data 105 to the image processing engine 140 and the entropy decoder 194 processes the representation of the TU 142 to generate the TU 142 (e.g., the quantized transform coefficients). In a particular aspect, the image processing engine 140 receives the bitstream data 105 via a modem or an interface from the bitstream source 104. In these implementations, the pixel processor 196 performs an inverse quantization operation based on the TU 142 (e.g., the quantized transform coefficients) to generate dequantized transform coefficients (DQ) 112. The pixel processor 196 then performs an inverse transform operation based on the DQ 112 to generate TU pixel data (PD) 114. The pixel processor 196 generates the TU PV 144 based on the TU PD 114. The pixel processor 196 stores the TU PV 144 via the interface 165 to the memory 192.

The image processing engine 140 (e.g., the pixel processor 196) updates the availability data 116 to indicate that the TU 142 is unavailable. For example, the image processing engine 140 sets a processed indicator corresponding to the TU 142 to the second value (e.g., 1) to indicate that the TU 142 has been processed at the pixel processor 196. In some implementations, the image processing engine 140 updates the availability data 116 concurrently with the pixel processor 196 retrieving the TU 142 from the memory 192 or concurrently with the pixel processor 196 storing the TU PV 144 to the memory 192.

Optionally, in some implementations, the processing order criteria 130 indicate that all luma TUs are to be processed prior to all chroma TUs of a LU 124. In an illustrative example, the pixel processor 196, based on the availability data 116 and the processing order criteria 130, determines that the L0 TU 152 can be processed next and processes the L0 TU 152 to generate L0 PV 172. The pixel processor 196, based on the availability data 116 and the processing order criteria 130, determines that the L1 TU 154 can be processed next and processes the L1 TU 154 to generate L1 PV 174. The pixel processor 196, based on the availability data 116 and the processing order criteria 130, determines that the CB TU 156 can be processed next and processes the CB TU 156 to generate CB PV 166. The pixel processor 196, based on the availability data 116 and the processing order criteria 130, determines that the CR TU 158 can be processed next and processes the CR TU 158 to generate CR PV 168. In this example, the processing order 132 includes processing of the L0 TU 152 followed by the L1 TU 154, and then the CB TU 156 followed by the CR TU 158.

Optionally, in some implementations, the processing order criteria 130 indicate that a chroma TU can be processed prior to an L1 TU if the chroma TU is available and the L1 TU is unavailable, as further described with reference to FIGS. 2-5. For example, the pixel processor 196, based on determining that the availability data 116 indicates that the CB TU 156 is available and that the L1 TU 154 is unavailable and has not been processed and that the processing order criteria 130 indicate that the CB TU 156 can be processed prior to the L1 TU 154, processes the CB TU 156 to generate the CB PV 166.

The pixel processor 196, based on determining that the availability data 116 indicates that all TUs (e.g., the L0 TU 152, the L1 TU 154, the CB TU 156, and the CR TU 158)

of the LU 124 have been processed, generates LU PV 180 of the LU 124 based on the reconstructed pixel values (e.g., the L0 PV 172, the L1 PV 174, the CB PV 166, and the CR PV 168) of the LU 124. For example, the pixel processor 196 retrieves the TUs (e.g., the L0 PV 172, the L1 PV 174, the CB PV 166, and the CR PV 168) via the interface 165 from the memory 192 and generates the LU PV 180 based on the retrieved TUs. The pixel processor 196 thus reconstructs at least the portion of the image frame 120 that corresponds to the LU 124. Optionally, in some implementations, the pixel processor 196 performs an upsampling operation based on the CB PV 166 to generate CB PV 176 and performs an upsampling operation based on the CR PV 168 to generate CR PV 178. In these implementations, the pixel processor 196 generates the LU PV 180 based on a combination of the L0 PV 172, the L1 PV 174, the CB PV 176, and the CR PV 178.

In some implementations, the image processing engine 140 provides the LU PV 180 to the display device 106. For example, the display device 106 is configured to display at least a portion of the image frame 120 that corresponds to the LU PV 180. A reconstructed LU (e.g., the LU PV 180) may differ from an original LU (e.g., original pixel values of the LU 124 at the bitstream source 104) due to quantization, lossy compression, prediction inaccuracies, transformations, transmission losses, etc. In some aspects, the differences are not noticeable to a user 108.

Optionally, in some implementations, the pixel processor 196, responsive to determining that all LUs 124 of the image frame 120 have been processed at the pixel processor 196, updates the time counter 118 to indicate a second time at which processing of the image frame 120 is complete.

A technical advantage of the system 100 includes reduced reconstruction latency of the LU 124. For example, when the pixel processor 196 generates the CB PV 166 without waiting for receipt of the L1 TU 154 from the entropy decoder 194, a reconstruction latency of the LU 124 is reduced and the LU PV 180 can be displayed earlier at the display device 106, thereby improving a viewing experience of a user 108, improving viewer retention, etc.

Figure 2:
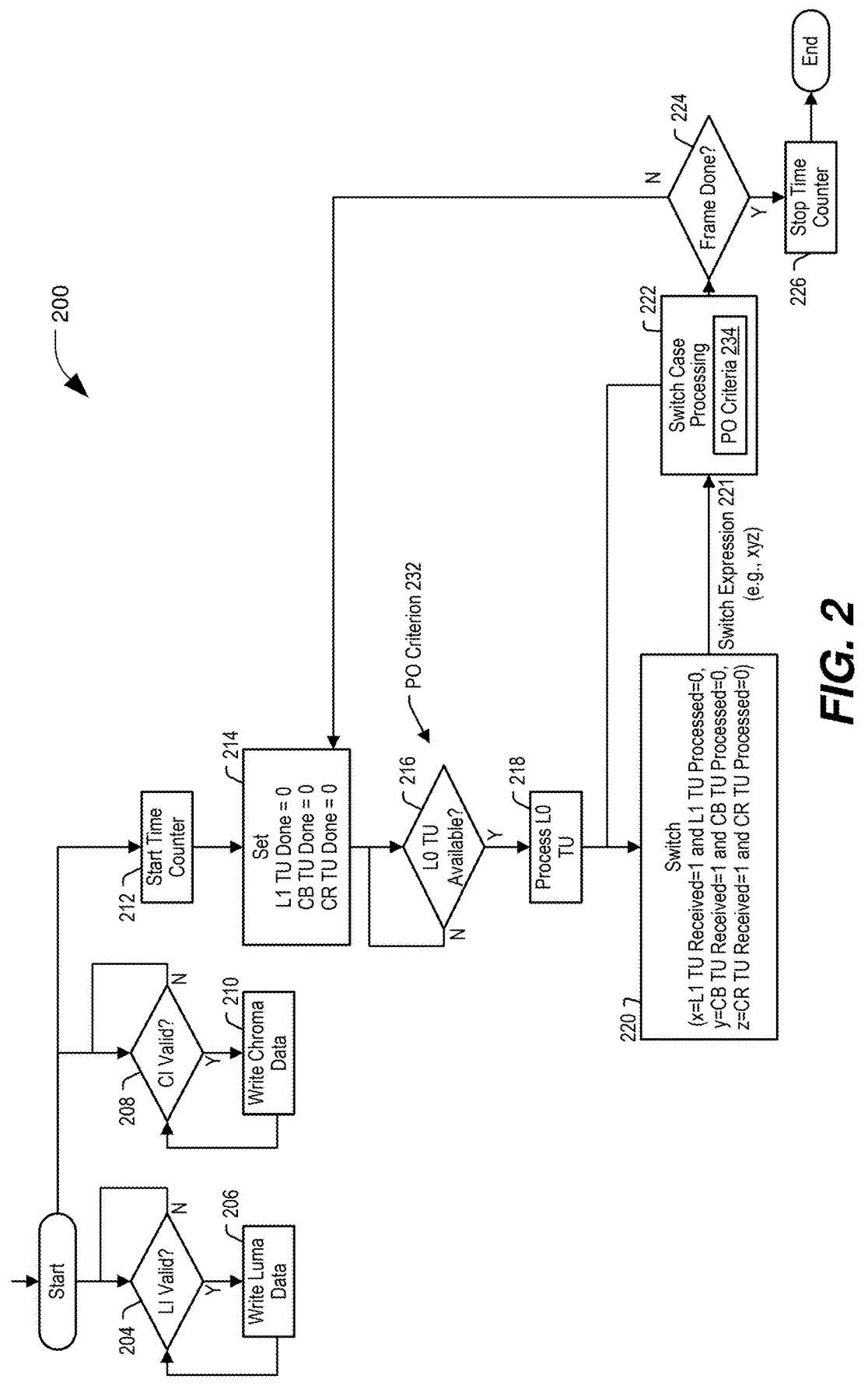
FIG. 2 is a diagram of a particular implementation of a method of processing image data from an entropy decoder, in accordance with some examples of the present disclosure.

Referring to FIG. 2, a diagram is shown of a particular implementation of a method 200 of processing image data from the entropy decoder 194, in accordance with some examples of the present disclosure. In a particular aspect, one or more operations of the method 200 are performed by the pixel processor 196, the image processing engine 140, the device 102, the system 100 of FIG. 1, or a combination thereof.

The method 200 corresponds to an example in which the processing order criteria 130 include a processing order criterion 232 indicating that a luma TU of a LU 124 is to be processed prior to processing remaining TUs of the LU 124. The processing order criteria 130 also include additional processing order criteria 234, as further described with reference to FIG. 3. In a particular aspect, the image processing engine 140 updates the availability data 116 of FIG. 1 (e.g., sets received indicators to 0) to indicate that none of the TUs of the LU 124 have been received from the entropy decoder 194.

The image processing engine 140 iteratively writes luma TUs of an image frame 120 from the entropy decoder 194 to the memory 192. For example, at 204, the image processing engine 140 determines whether the LI 162 (e.g., a luma channel buffer associated with the LI 162) has valid data. In response to the image processing engine 140 determining that the LI 162 does not have valid data, the method 200 returns to 204 (e.g., after a delay interval). Alternatively, at 206, the image processing engine 140, based on determining that the LI 162 has valid data, obtains luma data (e.g., the L0 TU 152 of FIG. 1) from the LI 162 (e.g., the luma channel buffer) and writes the luma data to the memory 192. The image processing engine 140 updates the availability data 116 (e.g., sets a received indicator to 1) to indicate that the luma data (e.g., the L0 TU 152) has been received from the entropy decoder 194. The method 200 then returns to 204.

Concurrently with writing the luma TUs to the memory 192, the image processing engine 140 iteratively writes chroma TUs of the image frame 120 from the entropy decoder 194 to the memory 192. For example, at 208, the image processing engine 140 determines whether the CI 164 (e.g., a chroma channel buffer associated with the CI 164) has valid data. In response to the image processing engine 140 determining that the CI 164 does not have valid data, the method 200 returns to 208 (e.g., after a delay interval). Alternatively, at 210, the image processing engine 140, based on determining that the CI 164 has valid data, obtains chroma data (e.g., the CB TU 156 of FIG. 1) from the CI 164 (e.g., the chroma channel buffer) and writes the chroma data to the memory 192. The image processing engine 140 updates the availability data 116 (e.g., sets a received indicator to 1) to indicate that the chroma data (e.g., the CB TU 156) has been received from the entropy decoder 194. The method 200 then returns to 208.

Concurrently with writing the luma TUs and the chroma TUs to the memory 192, the image processing engine 140 processes one or more LUs 124 of the image frame 120 at the pixel processor 196. For example, at 212, the image processing engine 140 starts the time counter 118 associated with the image frame 120. To illustrate, the image processing engine 140, at a first time, sets the time counter 118 to indicate the first time at which processing of the image frame 120 started.

At 214, the image processing engine 140 sets the availability data 116 to indicate that none of the TUs of the LU 124 have been processed. For example, the image processing engine 140 sets processed indicators corresponding to the TUs (e.g., the L0 TU 152, the L1 TU 154, the CB TU 156, and the CR TU 158) to a first value (e.g., 0) to indicate that the TUs have not been processed at the pixel processor 196.

At 216, the pixel processor 196 determines whether the L0 TU 152 is available. For example, the pixel processor 196 determines whether the availability data 116 indicates that the L0 TU 152 is available (e.g., a received indicator has a value of 1 and a processed indicator has a value of 0). In a particular aspect, determining whether the L0 TU 152 is available prior to processing remaining TUs of the LU 124 corresponds to the PO criterion 232. In response to the pixel processor 196 determining that the L0 TU 152 is unavailable, the method 200 returns to 216 (e.g., after a delay interval).

Alternatively, the pixel processor 196, in response to determining that the L0 TU 152 is available, at 216, processes the L0 TU 152, at 218. For example, the pixel processor 196, in response to determining that the availability data 116 indicates that the L0 TU 152 is available, retrieves the L0 TU 152 via the interface 165 from the memory 192, processes the L0 TU 152 to generate the L0 PV 172, and stores the L0 PV 172 via the interface 165 to the memory 192, as described with reference to FIG. 1.

The pixel processor 196 determines whether any of the remaining TUs of the LU 124 are available. For example, at 220, the pixel processor 196 evaluates a switch expression 221 corresponding to availability of the remaining TUs. The switch expression 221 has a first parameter (e.g., a parameter x) that has a value (e.g., a truth value corresponding to evaluation of "received indicator=1 and processed indicator=0") indicating whether the L1 TU 154 is available. The switch expression 221 has a second parameter (e.g., a parameter y) that has a value (e.g., a truth value corresponding to evaluation of "received indicator=1 and processed indicator=0") indicating whether the CB TU 156 is available. The switch expression 221 has a third parameter (e.g., a parameter z) that has a value (e.g., a truth value corresponding to evaluation of "received indicator=1 and processed indicator=0") indicating whether the CR TU 158 is available.

The pixel processor 196, based on determining that a TU of the LU 124 is available and that the processing order criteria 234 indicate that the TU can be processed next, processes the TU. For example, at 222, the pixel processor 196 performs switch case processing to process an available TU of the LU 124 based on the processing order criteria 234, as further described with reference to FIG. 3. It should be understood that evaluating a switch expression, at 220, and performing switch case processing, at 222, are provided as illustrative examples. In other examples, the pixel processor 196 can use other techniques to determine availability of TUs of the LU 124 and to process a next available TU of the LU 124 in accordance with the processing order criteria 234. In response to the pixel processor 196 determining that the LU 124 has at least one remaining TU to be processed, the method 200 returns to 220. Alternatively, at 224, the pixel processor 196, in response to determining that all TUs of the LU 124 have been processed, determines whether all LUs 124 of the image frame 120 have been processed.

In response to the pixel processor 196 determining that at least one LU 124 of the image frame 120 remains to be processed, the method 200 returns to 214. Alternatively, in response to the pixel processor 196 determining that all LUs 124 of the image frame 120 have been processed, the method 200 proceeds to 226.

At 226, the pixel processor 196, in response to determining that all LUs 124 of the image frame 120 have been processed, stops the time counter 118. For example, the pixel processor 196, in response to determining that all LUs 124 of the image frame 120 have been processed, updates the time counter 118 at a second time to indicate the second time at which processing of the image frame 120 is complete. In some examples, the pixel processor 196 updates the time counter 118 to indicate a difference between the first time that processing of the image frame 120 started and the second time that processing of the image frame 120 completed.

Referring to FIG. 3, a diagram is shown of a particular implementation of a method 300 of processing image data from the entropy decoder 194, in accordance with some examples of the present disclosure. In a particular aspect, one or more of the operations are performed by the pixel processor 196, the image processing engine 140, the device 102, the system 100 of FIG. 1, or a combination thereof.

The method 300 corresponds to an example in which the processing order criteria 234 indicate that an available CR TU can be processed next if each of the L1 TU and the CB TU are unavailable, that an available CB TU can be processed next if the L1 TU is unavailable, and that an available L1 TU can be processed next.

At 220, the pixel processor 196 evaluates the switch expression 221 (e.g., xyz) corresponding to availability of TUs of a LU 124 that is being processed, as described with reference to FIG. 2. For example, the switch expression 221 has a first parameter (e.g., a parameter x) that has a value indicating whether a L1 TU 154 of the LU 124 is available. The switch expression 221 has a second parameter (e.g., a parameter y) that has a value indicating whether a CB TU 156 of the LU 124 is available. The switch expression 221 has a third parameter (e.g., a parameter z) that has a value indicating whether a CR TU 158 of the LU 124 is available.

The pixel processor 196 compares the switch expression 221 (e.g., xyz) with case labels to determine which available TU, if any, is to be processed next to satisfy the processing order criteria 234. For example, at 302, the pixel processor 196 determines whether the switch expression 221 (e.g., xyz) matches case 000. In response to the pixel processor 196 determining that the switch expression 221 (e.g., xyz) matches case 000 indicating that none of the L1 TU 154, the CB TU 156, and the CR TU 158 are available, the method 300 advances to 304. Alternatively, in response to the pixel processor 196 determining that the switch expression 221 does not match case 000, the method 300 advances to 306.

At 304, the pixel processor 196 determines whether the availability data 116 indicates that processing of the LU 124 is complete. The pixel processor 196, in response to determining that the availability data 116 includes the processed indicator of each of the TUs having the second value (e.g., 1) indicating that all TUs have been processed at the pixel processor 196, determines that processing of the LU 124 is complete. In response to the pixel processor 196 determining that processing of the LU 124 is complete, the method 300 proceeds to 224. Alternatively, the pixel processor 196, in response to determining that the availability data 116 includes a processed indicator of at least one TU of the LU 124 having the first value (e.g., 0) indicating that the TU has not been processed at the pixel processor 196, determines that processing of the LU 124 is incomplete. In response to the pixel processor 196 determining that processing of the LU 124 is incomplete, the method 300 returns to 220.

Referring to 306, the pixel processor 196 determines whether the switch expression 221 (e.g., xyz) matches case 001 indicating that each of the L1 TU 154 and the CB TU 156 is unavailable and that the CR TU 158 is available. In response to the pixel processor 196 determining that the switch expression 221 (e.g., xyz) does not match case 001, the method 300 advances to 310. Alternatively, in response to the pixel processor 196 determining that each of the L1 TU 154 and the CB TU 156 is unavailable and that the CR TU 158 is available, the method 300 advances to 308 and the pixel processor 196 retrieves the CR TU 158 via the interface 165 from the memory 192, processes the CR TU 158 to generate the CR PV 168, stores the CR PV 168 via the interface 165 to the memory 192, and updates the availability data 116 to indicate that the CR TU 158 has been processed (e.g., sets the processed indicator to 1). The method 300 then returns to 220.

Referring to 310, the pixel processor 196 determines whether the switch expression 221 (e.g., xyz) matches case 010 indicating that each of the L1 TU 154 and the CR TU 158 is unavailable and that the CB TU 156 is available. In response to the pixel processor 196 determining that the switch expression 221 (e.g., xyz) does not match case 010, the method 300 advances to 314. Alternatively, in response to the pixel processor 196 determining that each of the L1 TU 154 and the CR TU 158 is unavailable and that the CB TU 156 is available, the method 300 advances to 312. At 312, the pixel processor 196 retrieves the CB TU 156 via the interface 165 from the memory 192, processes the CB TU 156 to generate the CB PV 166, stores the CB PV 166 via the interface 165 to the memory 192, and updates the availability data 116 to indicate that the CB TU 156 has been processed (e.g., sets the processed indicator to 1). The method 300 then returns to 220.

Referring to 314, the pixel processor 196 determines whether the switch expression 221 (e.g., xyz) matches case 011 indicating that the L1 TU 154 is unavailable and each of the CB TU 156 and the CR TU 158 is available. In response to the pixel processor 196 determining that the L1 TU 154 is unavailable and that each of the CB TU 156 and the CR TU 158 is available, the method 300 proceeds to 312. Alternatively, in response to the pixel processor 196 determining that the switch expression 221 (e.g., xyz) does not match case 011, the method 300 proceeds to 316. The switch expression 221 not matching any of cases 000, 001, 010, and 011 corresponds to the first parameter (e.g., the x parameter) of the switch expression 221 having a value (e.g., 1) indicating that the L1 TU 154 is available. At 316, the pixel processor 196 retrieves the L1 TU 154 via the interface 165 from the memory 192, processes the L1 TU 154 to generate the L1 PV 174, stores the L1 PV 174 via the interface 165 to the memory 192, and updates the availability data 116 to indicate that the L1 TU 154 has been processed (e.g., sets the processed indicator to 1). The method 300 then returns to 220.

A technical advantage of the method 300 includes prioritizing processing of an available L1 TU 154 over processing either an available CB TU 156 or an available CR TU 158, without processing of an available CB TU 156 or an available CR TU 158 having to wait for the L1 TU 154 to be available. For example, if the L1 TU 154 is unavailable and the CB TU 156 is available, the CB TU 156 can be processed next without waiting for the L1 TU 154 to be available for prior processing. Similarly, the method 300 enable prioritizing of an available CB TU 156 over processing of an available CR TU 158, without processing of an available CR TU 158 having to wait for the CB TU 156 to be available. For example, if the CB TU 156 is unavailable and the CR TU 158 is available, the CR TU 158 can be processed next without waiting for the CB TU 156 to be available for prior processing.

Figure 4:
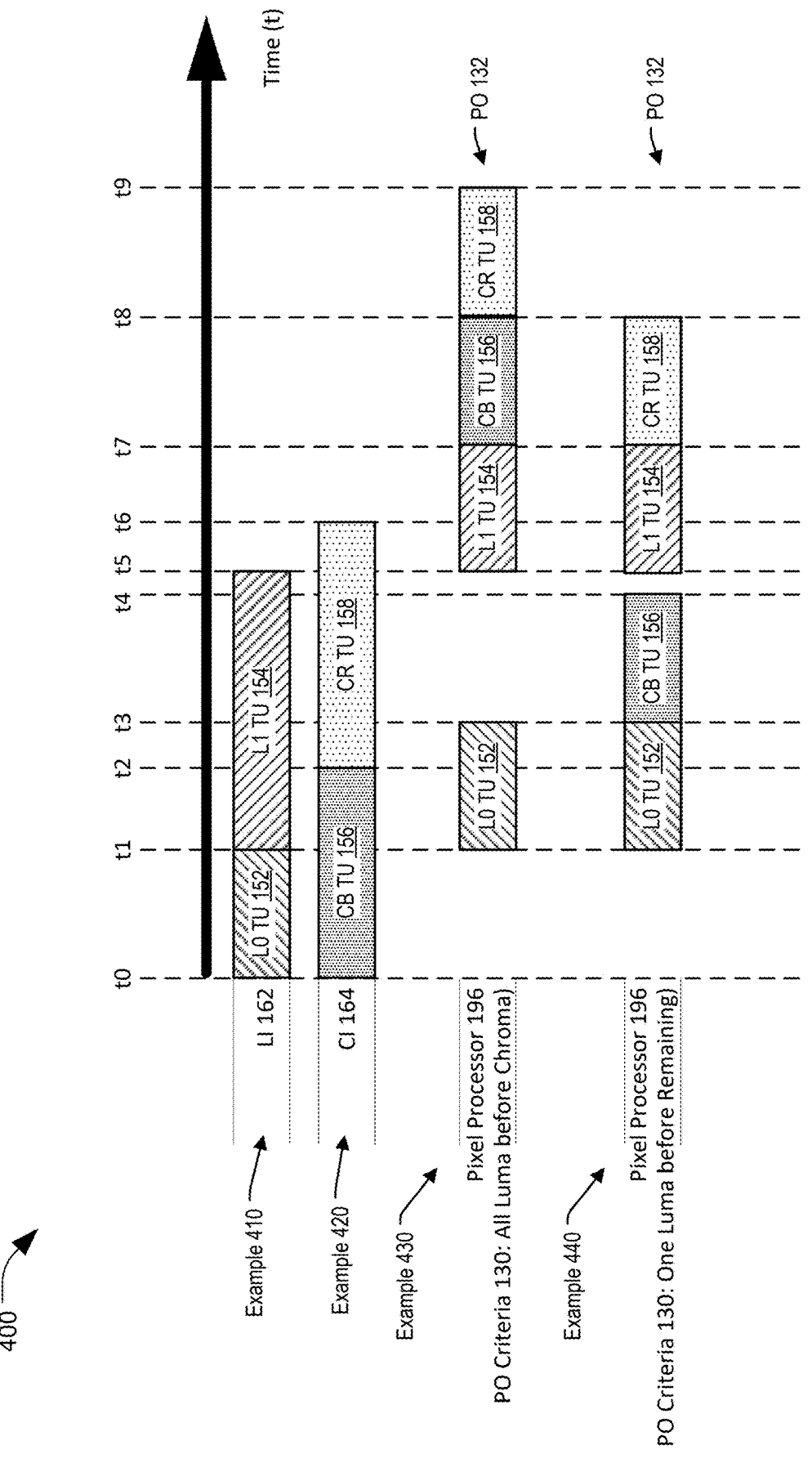
FIG. 4 is a timing diagram of an illustrative aspect of operations associated with an example of processing image data from an entropy decoder, in accordance with some examples of the present disclosure.

Referring to FIG. 4, a timing diagram is shown of an illustrative aspect of operations associated with an example 400 of processing image data from the entropy decoder 194, in accordance with some examples of the present disclosure.

The horizontal axis corresponds to time. An example 410 is shown of time taken to generate luma TUs of a LU 124 at the entropy decoder 194 to output the luma TUs via the LI 162. An example 420 is shown of time taken to generate chroma TUs of the LU 124 at the entropy decoder 194 to output the chroma TUs via the CI 164. An example 430 is shown of a processing order 132 of the TUs of the LU 124 in compliance with processing order criteria 130 in which all luma TUs are to be processed prior to all chroma TUs of an LU 124. An example 440 is shown of a processing order 132 of the TUs of the LU 124 in compliance with processing order criteria 130 in which one luma TU is to be processed prior to remaining TUs of an LU 124.

In the example 410, the entropy decoder 194 processes bitstream data 105 from a time t0 to a time t1 to generate the L0 TU 152 and from the time t1 to a time t5 to generate the L1 TU 154. The L0 TU 152 is received at the memory 192 at the time t1 via the LI 162 from the entropy decoder 194. The L1 TU 154 is received at the memory 192 at the time t5 via the LI 162 from the entropy decoder 194. Similarly, in the example 420, the entropy decoder 194 processes bitstream data 105 from the time t to a time t2 to generate the CB TU 156 and from the time t2 to a time t6 to generate the CR TU 158. The CB TU 156 is received at the memory 192 at the time t2 via the CI 164 from the entropy decoder 194. The CR TU 158 is received at the memory 192 at the time t6 via the CI 164 from the entropy decoder 194.

In the example 430, the pixel processor 196, based on determining that the processing order criteria 130 indicate that all luma TUs of a LU 124 are to be processed prior to all chroma TUs, processes the L0 TU 152 from the time t1 to a time t3 and waits until the L1 TU 154 is received at the memory 192 at the time t5. The pixel processor 196 then processes the L1 TU 154 from the time t5 to a time t7, processes the CB TU 156 from the time t7 to a time t8, and processes the CR TU 158 from the time t8 to a time t9. In this example, the PO 132 includes processing of the L0 TU 152 followed by the L1 TU 154 and then the CB TU 156 followed by the CR TU 158.

In the example 440, the pixel processor 196, based on determining that the PO criteria 130 indicate that one luma TU of the LU 124 is to be processed prior to remaining TUs and that an available CB TU can be processed prior to a second luma TU when the second luma TU is unavailable (e.g., as described with reference to FIGS. 2 and 3), processes the L0 TU 152 from the time t1 to a time t3 and processes the CB TU 156 from the time t3 to a time t4. The pixel processor 196 waits until a next remaining TU of the LU 124 is available. The pixel processor 196 processes the L1 TU 154 from the time t5 to the time t7 and processes the CR TU 158 from the time t7 to the time t8. In this example, the processing order 132 includes processing of the L0 TU 152 followed by the CB TU 156 and then the L1 TU 154 followed by the CR TU 158. A reduction in the reconstruction latency of the LU 124, in the example 440 relative to the example 430, corresponds to a difference between the time t8 and the time t9.

Figure 5:
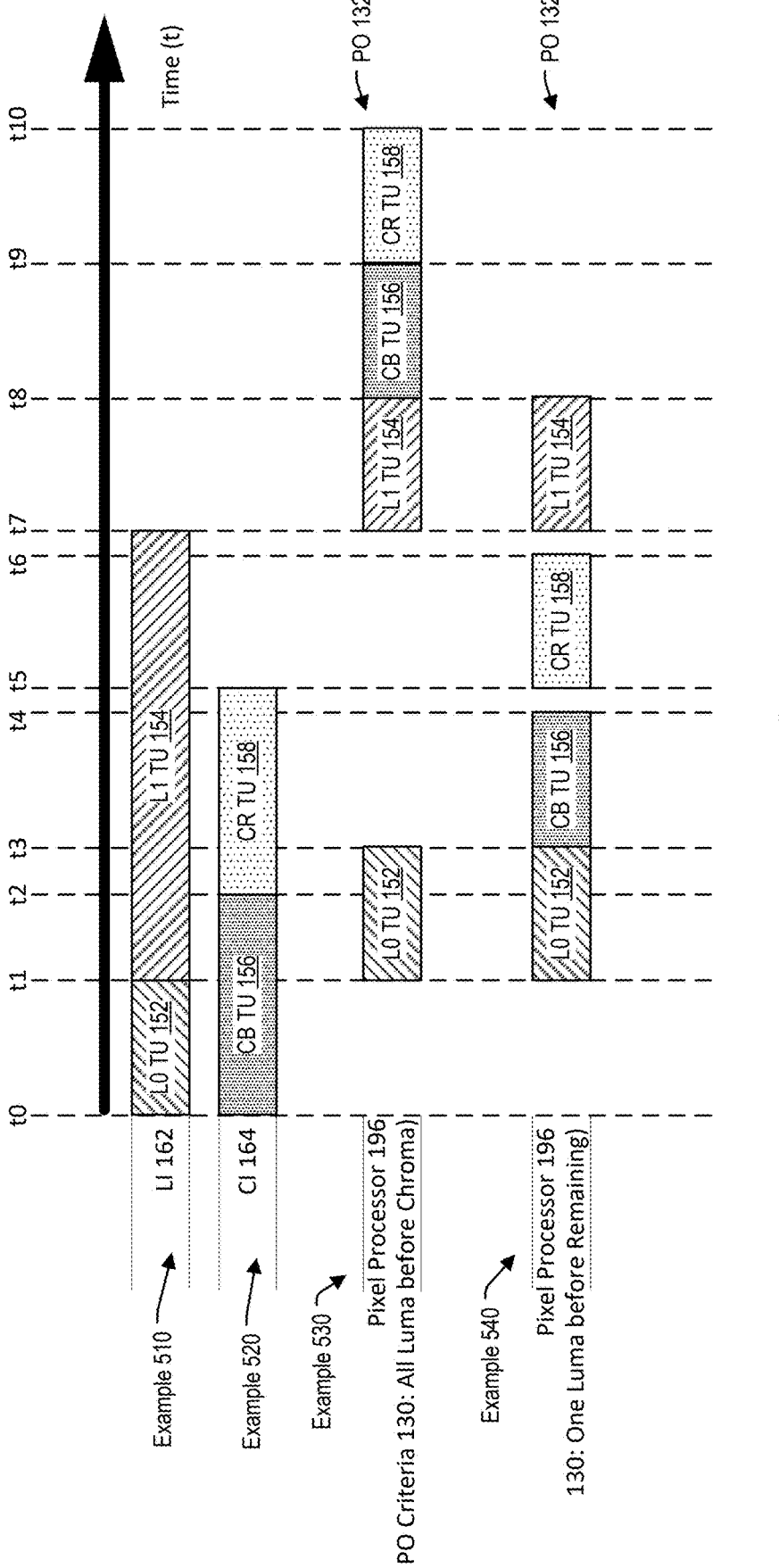
FIG. 5 is a timing diagram of an illustrative aspect of operations associated with another example of processing image data from an entropy decoder, in accordance with some examples of the present disclosure.

Referring to FIG. 5, a timing diagram is shown of an illustrative aspect of operations associated with an example 500 of processing image data from the entropy decoder 194, in accordance with some examples of the present disclosure.

The horizontal axis corresponds to time. An example 510 is shown of time taken to generate luma TUs of a LU 124 at the entropy decoder 194 to output the luma TUs via the LI 162. An example 520 is shown of time taken to generate chroma TUs of the LU 124 at the entropy decoder 194 to output the chroma TUs via the CI 164. An example 530 is shown of a processing order 132 of the TUs of the LU 124 in compliance with processing order criteria 130 in which all luma TUs are to be processed prior to all chroma TUs of an LU 124. An example 540 is shown of a processing order 132 of the TUs of the LU 124 in compliance with processing order criteria 130 in which one luma TU is to be processed prior to remaining TUs of an LU 124.

In the example 500, the L1 TU 154 is received at the memory 192 subsequent to receipt of the L0 TU 152, the L1 TU 154, and the CB TU 156. To illustrate, in the example 510, the entropy decoder 194 processes bitstream data 105 from a time t0 to a time t1 to generate the L0 TU 152 and from the time t1 to a time t7 to generate the L1 TU 154. The L0 TU 152 is received at the memory 192 at the time t1 via the LI 162 from the entropy decoder 194. The L1 TU 154 is received at the memory 192 at the time t7 via the LI 162 from the entropy decoder 194. Similarly, in the example 520, the entropy decoder 194 processes bitstream data 105 from the time to to a time t2 to generate the CB TU 156 and from the time t2 to a time t5 to generate the CR TU 158. The CB TU 156 is received at the memory 192 at the time t2 via the CI 164 from the entropy decoder 194. The CR TU 158 is received at the memory 192 at the time t5 via the CI 164 from the entropy decoder 194.

In the example 530, the pixel processor 196, based on determining that the PO criteria 130 indicate that all luma TUs of a LU 124 are to be processed prior to all chroma TUs, processes the L0 TU 152 from the time t1 to a time t3 and waits until the L1 TU 154 is received at the memory 192 at the time t7. The pixel processor 196 then processes the L1 TU 154 from the time t7 to a time t8, processes the CB TU 156 from the time t8 to a time t9, and processes the CR TU 158 from the time t9 to a time t10. In this example, the processing order 132 includes processing of the L0 TU 152 followed by the L1 TU 154 and then the CB TU 156 followed by the CR TU 158.

In the example 540, the pixel processor 196, based on determining that the PO criteria 130 indicate that one luma TU of the LU 124 is to be processed prior to remaining TUs and that an available chroma TU can be processed prior to a second luma TU when the second luma TU is unavailable (e.g., as described with reference to FIGS. 2 and 3), processes the L0 TU 152 from the time t1 to a time t3 and processes the CB TU 156 from the time t3 to a time t4. The pixel processor 196 waits until a next remaining TU of the LU 124 is available. The pixel processor 196 processes the CR TU 158 from the time t5 to a time t6. The pixel processor 196 waits until a next remaining TU of the LU 124 is available. The pixel processor 196 processes the L1 TU 154 from the time t7 to a time t8. In this example, the processing order 132 includes processing of the L0 TU 152 followed by the CB TU 156 and then the CR TU 158 followed by the LI TU 154. A reduction in the reconstruction latency of the LU 124, in the example 540 relative to the example 530, corresponds to a difference between the time t8 and the time t10.

Figure 6:
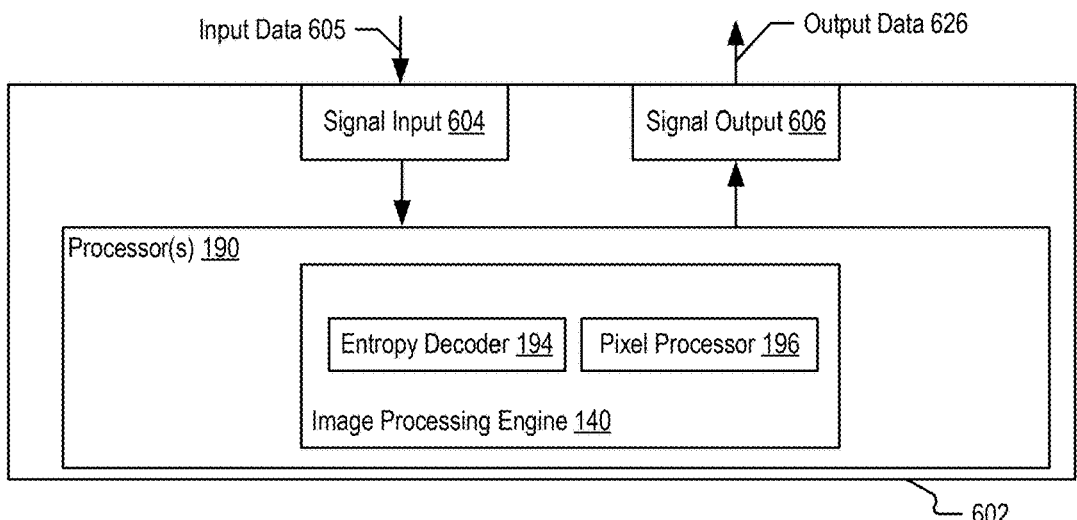
FIG. 6 illustrates an example of an integrated circuit operable to process image data from an entropy decoder, in accordance with some examples of the present disclosure.
Figure 10:
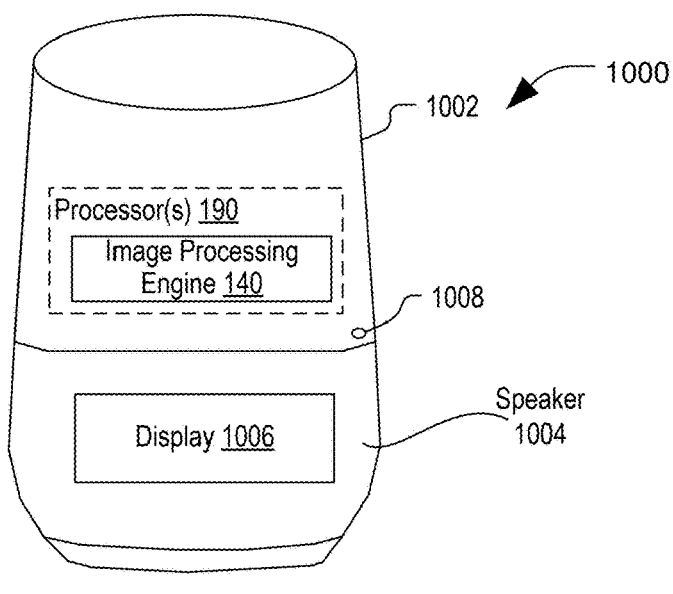
FIG. 10 is a diagram of a voice-controlled speaker system operable to process image data from an entropy decoder, in accordance with some examples of the present disclosure.
Figure 11:
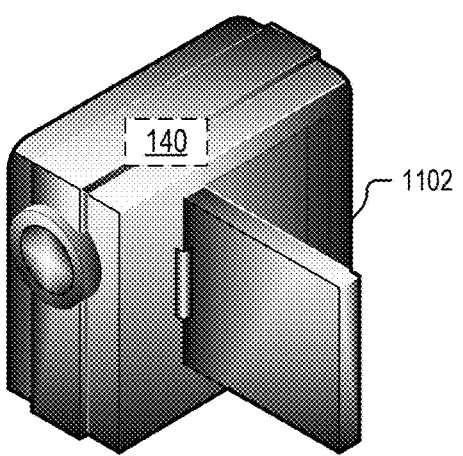
FIG. 11 is a diagram of a camera operable to process image data from an entropy decoder, in accordance with some examples of the present disclosure.
Figure 12:
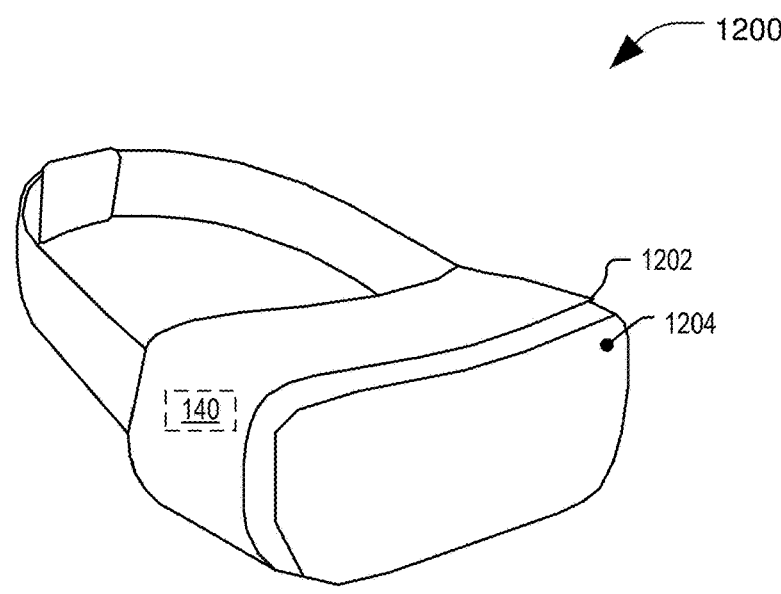
FIG. 12 is a diagram of a headset, such as a virtual reality, mixed reality, or augmented reality headset, operable to process image data from an entropy decoder, in accordance with some examples of the present disclosure.

FIG. 6 depicts an implementation 600 of the device 102 as an integrated circuit 602 that includes the one or more processors 190. The one or more processors 190 include the pixel processor 196. Optionally, in some implementations, the one or more processors 190 include the image processing engine 140 that includes the entropy decoder 194 and the pixel processor 196. The integrated circuit 602 also includes a signal input 604, such as one or more bus interfaces, to enable input data 605, such as the bitstream data 105, to be received for processing. The integrated circuit 602 also includes a signal output 606, such as a bus interface, to enable sending of output data 626, such as the LU PV 180. The integrated circuit 602 enables implementation of processing image data from an entropy decoder as a component in a system, such as a mobile phone or tablet as depicted in FIG. 7, a wearable electronic device as depicted in FIG. 8, augmented reality or mixed reality glasses, as described with reference to FIG. 9, a voice-controlled speaker system as depicted in FIG. 10, a camera as depicted in FIG. 11, a virtual reality, mixed reality, or augmented reality headset as depicted in FIG. 12, or a vehicle as depicted in FIG. 13 or FIG. 14.

Figure 7:
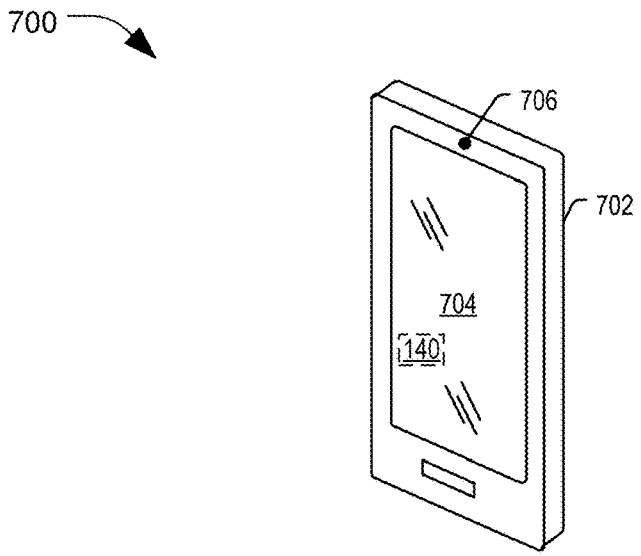
FIG. 7 is a diagram of a mobile device operable to process image data from an entropy decoder, in accordance with some examples of the present disclosure.

FIG. 7 depicts an implementation 700 in which the device 102 includes a mobile device 702, such as a phone or tablet, as illustrative, non-limiting examples. The mobile device 702 includes a display screen 704 and a camera 706. Components of the one or more processors 190, including the image processing engine 140, are integrated in the mobile device 702 and are illustrated using dashed lines to indicate internal components that are not generally visible to a user of the mobile device 702. In a particular example, the image processing engine 140 operates to obtain bitstream data 105, which is then processed to perform one or more operations at the mobile device 702, such as to launch a graphical user interface or otherwise display other information associated with the bitstream data 105 at the display screen 704 (e.g., via an integrated "smart assistant" application). For example, the image processing engine 140 obtains the bitstream data 105 from the camera 706 or another bitstream source. The image processing engine 140 displays, at the display screen 704, at least a portion of the image frame 120 corresponding to the LU PV 180.

Figure 8:
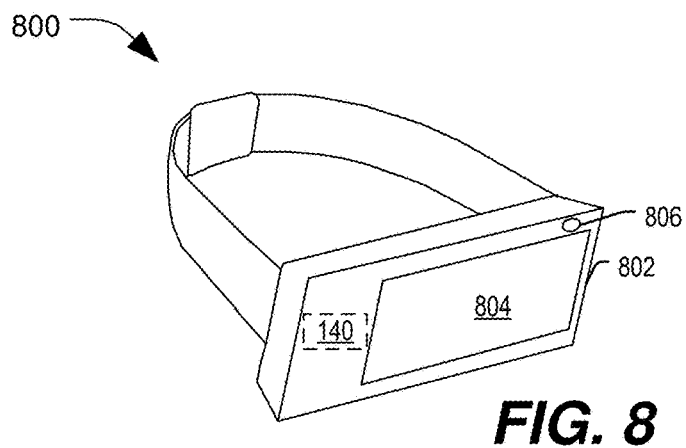
FIG. 8 is a diagram of a wearable electronic device operable to process image data from an entropy decoder, in accordance with some examples of the present disclosure.

FIG. 8 depicts an implementation 800 in which the device 102 includes a wearable electronic device 802, illustrated as a "smart watch." The image processing engine 140 and a camera 806 are integrated into the wearable electronic device 802. In a particular example, the image processing engine 140 operates to obtain the bitstream data 105, which is then processed to perform one or more operations at the wearable electronic device 802, such as to launch a graphical user interface or otherwise display other information associated with the bitstream data 105 at a display screen 804 of the wearable electronic device 802. To illustrate, the wearable electronic device 802 may include the display screen 804 that is configured to display a notification based on the bitstream data 105 obtained by the wearable electronic device 802. In a particular aspect, the image processing engine 140 obtains the bitstream data 105 from the camera 806 or another bitstream source. In a particular example, the wearable electronic device 802 includes a haptic device that provides a haptic notification (e.g., vibrates) in response to detection of the bitstream data 105. For example, the haptic notification can cause a user to look at the wearable electronic device 802 to see a displayed notification indicating detection of the bitstream data 105 corresponding to an image frame 120 or to see at least a portion of the image frame 120 displayed at the display screen 804. The wearable electronic device 802 can thus alert a user with a hearing impairment or a user wearing a headset that the bitstream data 105 of an image frame 120 is detected or that at least a portion of the image frame 120 is displayed.

Figure 9:
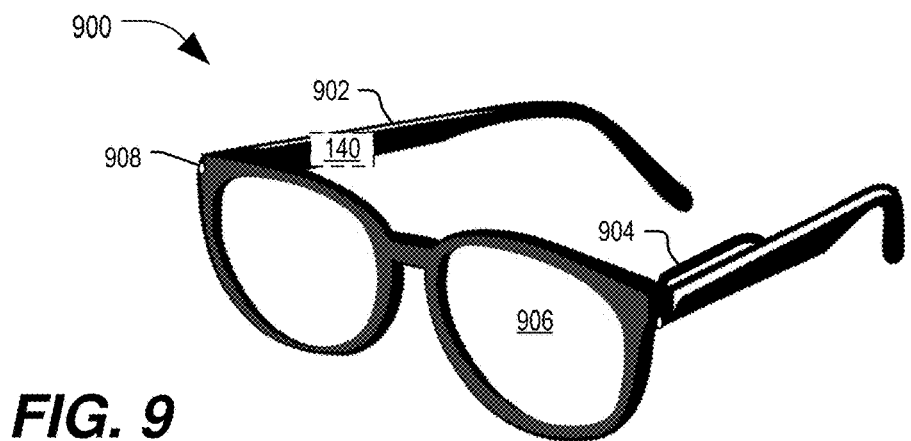
FIG. 9 is a diagram of a mixed reality or augmented reality glasses device operable to process image data from an entropy decoder, in accordance with some examples of the present disclosure.

FIG. 9 depicts an implementation 900 in which the device 102 includes a portable electronic device that corresponds to augmented reality or mixed reality glasses 902. The glasses 902 include a holographic projection unit 904 configured to project visual data onto a surface of a lens 906 or to reflect the visual data off of a surface of the lens 906 and onto the wearer's retina. The image processing engine 140, a camera 908, or both, are integrated into the glasses 902. The image processing engine 140 may function to generate the LU PV 180 based on bitstream data 105 received from the camera 908 or another bitstream source. In a particular example, the holographic projection unit 904 is configured to display a notification indicating that bitstream data 105 of an image frame 120 is obtained or that the LU PV 180 is available for display. In a particular example, the holographic projection unit 904 is configured to display the notification, at least a portion of the image frame 120 corresponding to the LU PV 180, or both. For example, the notification, at least the portion of the image frame 120, or both, can be superimposed on the user's field of view.

FIG. 10 is an implementation 1000 in which the device 102 includes a wireless speaker and voice activated device 1002. The wireless speaker and voice activated device 1002 can have wireless network connectivity and is configured to execute an assistant operation. The one or more processors 190, including the image processing engine 140, are included in the wireless speaker and voice activated device 1002. The wireless speaker and voice activated device 1002 also includes a speaker 1004, a display screen 1006, and a camera 1008. During operation, in response to receiving a verbal command, the wireless speaker and voice activated device 1002 can execute assistant operations, such as via execution of a voice activation system (e.g., an integrated assistant application). The assistant operations can include adjusting a temperature, playing music, turning on lights, displaying an image, etc. For example, the assistant operations are performed responsive to receiving a command after a keyword or key phrase (e.g., "hello assistant"). In an example, the image processing engine 140 obtains the bitstream data 105 from the camera 1008 or another bitstream source, generates the LU PV 180, and uses the display screen 1006 to display at least a portion of the image frame 120 corresponding to the LU PV 180.

FIG. 11 depicts an implementation 1100 in which the device 102 includes a portable electronic device that corresponds to a camera device 1102. The image processing engine 140 is included in the camera device 1102. During operation, in response to receiving a user input, the camera device 1102 can execute operations, such as to adjust image or video capture settings, image or video playback settings, or image or video capture instructions, as illustrative examples. The camera device 1102 can generate the bitstream data 105 corresponding to an image frame 120 and provide at least a portion of the image frame 120 corresponding to the LU PV 180 to a display.

FIG. 12 depicts an implementation 1200 in which the device 102 includes a portable electronic device that corresponds to a virtual reality, mixed reality, or augmented reality headset 1202. The image processing engine 140 and a camera 1204 are integrated into the headset 1202. A visual interface device is positioned in front of the user's eyes to enable display of augmented reality, mixed reality, or virtual reality images or scenes to the user while the headset 1202 is worn. In a particular example, the image processing engine 140 obtains the bitstream data 105 from the camera 1204 or another bitstream source, and the visual interface device is configured to display at least a portion of the image frame 120 corresponding to the LU PV 180.

FIG. 13 depicts an implementation 1300 in which the device 102 corresponds to, or is integrated within, a vehicle 1302, illustrated as a manned or unmanned aerial device (e.g., a package delivery drone). The image processing engine 140 and a camera 1304 are integrated into the vehicle 1302. The image processing engine 140 obtains the bitstream data 105 from the camera 1304 or another bitstream source, and a display screen (e.g., of the vehicle 1302 or a user device) displays at least a portion of an image frame 120, such as depicting assembly instructions for a package delivered by the vehicle 1302.

FIG. 14 depicts another implementation 1400 in which the device 102 corresponds to, or is integrated within, a vehicle 1402, illustrated as a car. The vehicle 1402 includes the one or more processors 190 including the image processing engine 140. The vehicle 1402 also includes a camera 1404. In a particular implementation, in response to receiving a verbal command, a voice activation system initiates one or more operations of the vehicle 1402 based on one or more keywords (e.g., "unlock," "start engine," "play music," "display weather forecast," or another voice command), such as by providing feedback or information via a display 1420 or one or more speakers. In an example, the image processing engine 140 obtains the bitstream data 105 of an image frame 120 from the camera 1404 or another bitstream source, generates the LU PV 180, and provides at least a portion of the image frame 120 corresponding to the LU PV 180 to the display 1420.

Referring to FIG. 15, a particular implementation of a method 1500 of processing image data from the entropy decoder 194 is shown. In a particular aspect, one or more operations of the method 1500 are performed by at least one of the pixel processor 196, the image processing engine 140, the one or more processors 190, the device 102, the system 100 of FIG. 1, the integrated circuit 602 of FIG. 6, or a combination thereof.

The method 1500 includes determining, at a pixel processor, whether a luma TU from an entropy decoder is available, where a logical unit of an image frame includes at least the luma TU and at least a chroma TU, at 1502. For example, the pixel processor 196 determines whether a L1 TU 154 of a LU 124 from the entropy decoder 194 is available at the memory 192, as described with reference to FIG. 1. To illustrate, the pixel processor 196 determines whether the availability data 116 indicates that a received indicator associated with the L1 TU 154 has a second value (e.g., 1) indicating that the L1 TU 154 has been received at the memory 192 and that a processed indicator associated with the L1 TU 154 has a first value (e.g., 0) indicating that the L1 TU 154 has not been processed at the pixel processor 196.

The method 1500 also includes determining, at the pixel processor, whether the chroma TU from the entropy decoder is available, at 1504. For example, the pixel processor 196 determines whether a CB TU 156 of the LU 124 from the entropy decoder 194 is available at the memory 192, as described with reference to FIG. 1. To illustrate, the pixel processor 196 determines whether the availability data 116 indicates that a received indicator associated with the CB TU 156 has a second value (e.g., 1) indicating that the CB TU 156 has been received at the memory 192 and that a processed indicator associated with the CB TU 156 has a first value (e.g., 0) indicating that the CB TU 156 has not been processed at the pixel processor 196.

The method 1500 includes, based on a determination that the chroma TU is available and that the luma TU is unavailable, processing, at the pixel processor, the chroma TU to generate chroma pixel values of the logical unit prior to processing the luma TU to generate luma pixel values of the logical unit, at 1506. For example, the pixel processor 196, based on determining that the CB TU 156 is available and that the L1 TU 154 is unavailable, processes the CB TU 156 to generate the CB PV 166 prior to processing the L1 TU 154 to generate the L1 PV 174, as described with reference to FIGS. 1 and 3-5.

The method 1500 thus reduces a reconstruction latency associated with the LU 124. For example, the pixel processor 196 can continue to process an available chroma TU without waiting for an unavailable luma TU to become available.

The method 1500 of FIG. 15 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1500 of FIG. 15 may be performed by a processor that executes instructions, such as described with reference to FIG. 16.

Figure 16:
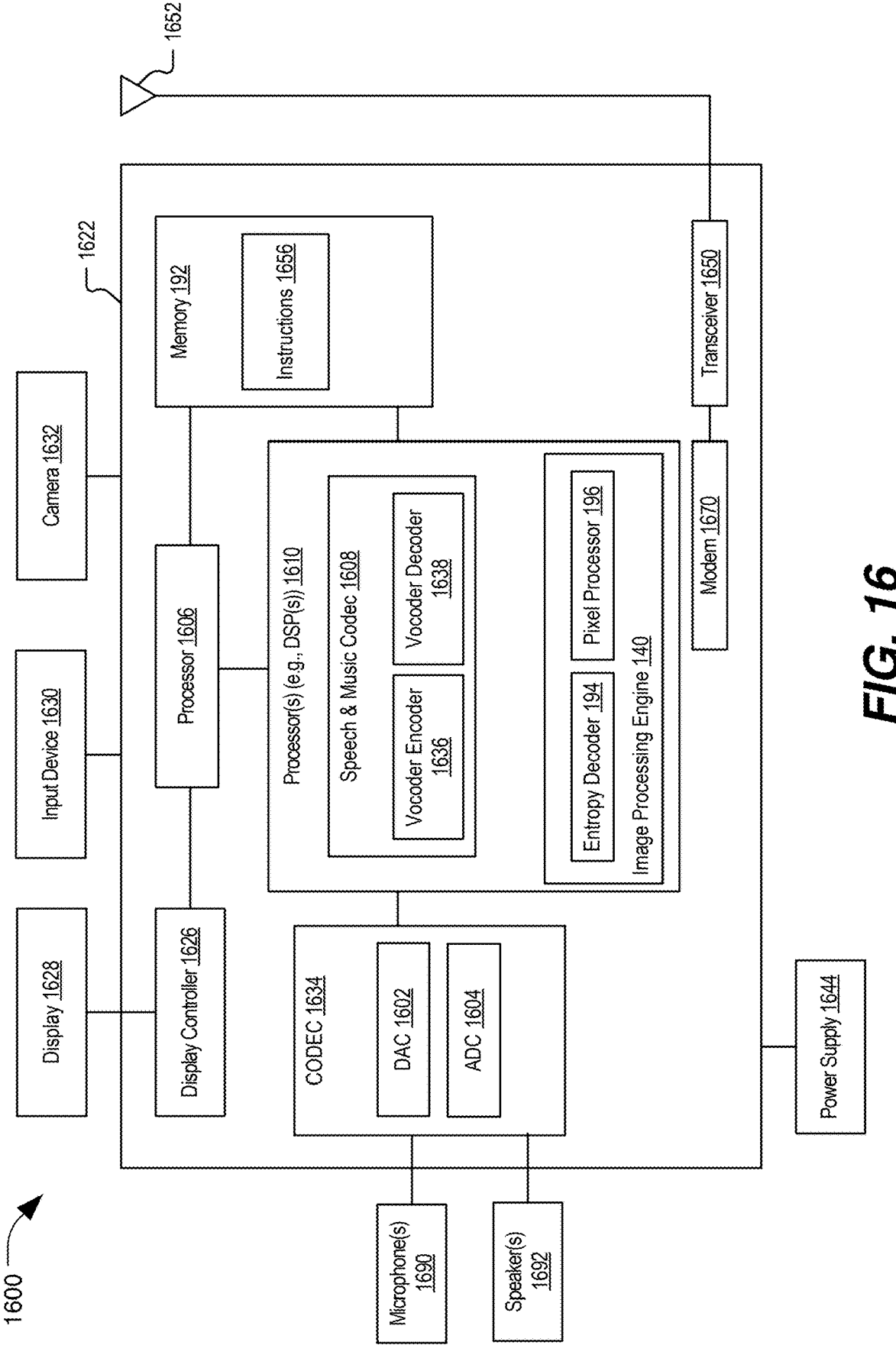
FIG. 16 is a block diagram of a particular illustrative example of a device that is operable to process image data from an entropy decoder, in accordance with some examples of the present disclosure.

Referring to FIG. 16, a block diagram of a particular illustrative implementation of a device is depicted and generally designated 1600. In various implementations, the device 1600 may have more or fewer components than illustrated in FIG. 16. In an illustrative implementation, the device 1600 may correspond to the device 102. In an illustrative implementation, the device 1600 may perform one or more operations described with reference to FIGS. 1-15.

In a particular implementation, the device 1600 includes a processor 1606 (e.g., a CPU). The device 1600 may include one or more additional processors 1610 (e.g., one or more DSPs). In a particular aspect, the one or more processors 190 of FIG. 1 correspond to the processor 1606, the processors 1610, or a combination thereof. The processors 1610 may include a speech and music coder-decoder (CODEC) 1608 that includes a voice coder ("vocoder") encoder 1636, a vocoder decoder 1638, or both. The processors 1610 include the pixel processor 196. For example, the processors 1610 may include the image processing engine 140 that includes the entropy decoder 194 and the pixel processor 196.

The device 1600 may include the memory 192 and a CODEC 1634. The memory 192 may include instructions 1656 that are executable by the one or more additional processors 1610 (or the processor 1606) to implement the functionality described with reference to the entropy decoder 194, the pixel processor 196, the image processing engine 140, or a combination thereof. The device 1600 may include a modem 1670 coupled, via a transceiver 1650, to an antenna 1652. Optionally, in some aspects, the modem 1670 is configured to receive the bitstream data 105 of FIG. 1, transmit the LU PV 180, or both.

The device 1600 may include a display 1628 coupled to a display controller 1626. One or more microphones 1690, one or more speakers 1692, or a combination thereof, may be coupled to the CODEC 1634. The CODEC 1634 may include a digital-to-analog converter (DAC) 1602, an analog-to-digital converter (ADC) 1604, or both. In a particular implementation, the CODEC 1634 may receive analog signals from the microphone(s) 1690, convert the analog signals to digital signals using the analog-to-digital converter 1604, and provide the digital signals to the speech and music codec 1608. The speech and music codec 1608 may process the digital signals. In a particular implementation, the speech and music codec 1608 may provide digital signals to the CODEC 1634. The CODEC 1634 may convert the digital signals to analog signals using the digital-to-analog converter 1602 and may provide the analog signals to the speaker(s) 1692.

In a particular implementation, the device 1600 may be included in a system-in-package or system-on-chip device 1622. In a particular implementation, the memory 192, the processor 1606, the processors 1610, the display controller 1626, the CODEC 1634, and the modem 1670 are included in the system-in-package or system-on-chip device 1622. In a particular implementation, an input device 1630, a camera 1632, and a power supply 1644 are coupled to the system-in-package or the system-on-chip device 1622. Moreover, in a particular implementation, as illustrated in FIG. 16, the display 1628, the input device 1630, the camera 1632, the speaker(s) 1692, the microphone(s) 1690, the antenna 1652, and the power supply 1644 are external to the system-in-package or the system-on-chip device 1622. In a particular implementation, each of the display 1628, the input device 1630, the camera 1632, the speaker(s) 1692, the microphone(s) 1690, the antenna 1652, and the power supply 1644 may be coupled to a component of the system-in-package or the system-on-chip device 1622, such as an interface or a controller.

The device 1600 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IOT) device, a virtual reality (VR) device, a base station, a mobile device, or any combination thereof.

In conjunction with the described implementations, an apparatus includes means for determining whether a luma transform unit (TU) from an entropy decoder is available. A logical unit of an image frame includes at least the luma TU and at least a chroma TU. For example, the means for determining can correspond to pixel processor 196, the image processing engine 140, the device 102, the system 100 of FIG. 1, the integrated circuit 602 of FIG. 6, the processor 1606, the processors 1610, the device 1600, one or more other circuits or components configured to determine whether a luma TU from an entropy decoder is available, or any combination thereof.

The apparatus also includes means for determining whether the chroma TU from the entropy decoder is available. For example, the means for determining can correspond to pixel processor 196, the image processing engine 140, the device 102, the system 100 of FIG. 1, the integrated circuit 602 of FIG. 6, the processor 1606, the processors 1610, the device 1600, one or more other circuits or components configured to determine whether a chroma TU from the entropy decoder is available, or any combination thereof.

The apparatus includes means for processing the chroma TU to generate chroma pixel values of the logical unit prior to processing the luma TU to generate luma pixel values of the logical unit, the chroma TU processed based on a determination that the chroma TU is available and that the luma TU is unavailable. For example, the means for processing can correspond to pixel processor 196, the image processing engine 140, the device 102, the system 100 of FIG. 1, the integrated circuit 602 of FIG. 6, the processor 1606, the processors 1610, the device 1600, one or more other circuits or components configured to process the chroma TU prior to processing the luma TU, or any combination thereof.

In some implementations, a non-transitory computer-readable medium (e.g., a computer-readable storage device, such as the memory 192) includes instructions (e.g., the instructions 1656) that, when executed by one or more processors (e.g., the processor 190, the integrated circuit 602, the one or more processors 1610, the processor 1606, or a combination thereof), cause the one or more processors to determine, at a pixel processor (e.g., the pixel processor 196), whether a luma transform unit (TU) (e.g., the L1 TU 154) from an entropy decoder (e.g., the entropy decoder 194) is available. A logical unit (e.g., the LU 124) of an image frame (e.g., the image frame 120) includes at least the luma TU and at least a chroma TU (e.g., the CB TU 156). The instructions also cause the one or more processors to determine, at the pixel processor, whether the chroma TU from the entropy decoder is available. The instructions further cause the one or more processors to, based on a determination that the chroma TU is available and that the luma TU is unavailable, process, at the pixel processor, the chroma TU to generate chroma pixel values (e.g., the CB PV 166) of the logical unit prior to processing the luma TU to generate luma pixel values (e.g., the L1 PV 174) of the logical unit.

Particular aspects of the disclosure are described below in sets of interrelated Examples:

According to Example 1, a device includes a memory configured to store image data associated with a logical unit of an image frame, the logical unit including at least a luma transform unit (TU) and at least a chroma TU; and one or more processors coupled to the memory, wherein the one or more processors are configured to determine, at a pixel processor, whether the luma TU from an entropy decoder is available; determine, at the pixel processor, whether the chroma TU from the entropy decoder is available; and based on a determination that the chroma TU is available and that the luma TU is unavailable, process, at the pixel processor, the chroma TU to generate chroma pixel values of the logical unit prior to processing the luma TU to generate luma pixel values of the logical unit.

Example 2 includes the device of Example 1, wherein the at least one luma TU of the logical unit includes a first luma TU, and a second luma TU, and wherein the chroma TU is processed subsequent to the first luma TU being processed at the pixel processor to generate first luma pixel values and prior to the second luma TU being processed at the pixel processor to generate second luma pixel values.

Example 3 includes the device of Example 1 or Example 2, wherein the image frame corresponds to a plurality of logical coding units (LCUs), each LCU of the plurality of LCUs includes two logical units, each logical unit of the two logical units includes at least a respective luma TU and at least a respective chroma TU, and one LCU of the plurality of LCUs includes the logical unit and another logical unit.

Example 4 includes the device of any of Examples 1 to 3, wherein a TU of the logical unit corresponds to quantized transform coefficients, and wherein the one or more processors are configured to perform, at the pixel processor, an inverse quantization operation based on the quantized transform coefficients to generate dequantized transform coefficients; perform, at the pixel processor, an inverse transform operation based on the dequantized transform coefficients to generate TU pixel data; and generate, at the pixel processor, TU pixel values based on the TU pixel data.

Example 5 includes the device of Example 4, and the device also includes a modem coupled to the one or more processors, the modem configured to receive a bitstream including a representation of the TU, wherein the one or more processors are configured to process, at the entropy decoder, the representation of the TU to generate the quantized transform coefficients.

Example 6 includes the device of Example 4 or Example 5, and the device also includes a camera coupled to the one or more processors, the camera configured to generate a bitstream including a representation of the TU, wherein the one or more processors are configured to process, at the entropy decoder, the representation of the TU to generate the quantized transform coefficients.

Example 7 includes the device of any of Examples 4 to 6, and the device also includes a display device coupled to the one or more processors, the display device configured to display at least a portion of the image frame that corresponds to the TU pixel values.

Example 8 includes the device of any of Examples 1 to 7, wherein the one or more processors are configured to, in response to a determination that a TU of the logical unit has been output from the entropy decoder and has not been processed at the pixel processor, determine that the TU is available.

Example 9 includes the device of any of Examples 1 to 8, wherein the memory is configured to store availability data of the logical unit, the availability data indicating whether TUs of the logical unit are available.

Example 10 includes the device of Example 9, wherein the one or more processors are configured to, in response to receipt of a TU of the logical unit from the entropy decoder, update the availability data to indicate that the TU has been output from the entropy decoder.

Example 11 includes the device of Example 9 or Example 10, wherein the one or more processors are configured to, responsive to a determination that a TU of the logical unit has been processed at the pixel processor, update the availability data to indicate that the TU has been processed at the pixel processor.

Example 12 includes the device of any of Examples 9 to 11, wherein the availability data includes a received indicator and a processed indicator of a TU of the logical unit, and wherein the one or more processors are configured to, based on a value of the received indicator, determine whether the TU has been output from the entropy decoder; and based on a value of the processed indicator, determine whether the TU has been processed at the pixel processor.

Example 13 includes the device of any of Examples 9 to 12, wherein the one or more processors are configured to determine, based on the availability data, a processing order at the pixel processor of the TUs of the logical unit.

Example 14 includes the device of any of Examples 1 to 13, wherein the memory and the one or more processors are integrated into at least one of a mobile phone, a tablet computer device, a wearable electronic device, a camera device, a vehicle, or an extended reality device.

Example 15 includes the device of any of Examples 1 to 14, wherein the one or more processors are configured to perform, at the pixel processor, an inverse quantization operation based on quantized transform coefficients to generate dequantized transform coefficients, wherein a TU of the logical unit corresponds to the quantized transform coefficients; perform, at the pixel processor, an inverse transform based on the dequantized transform coefficients to generate TU pixel data; and generate, at the pixel processor, TU pixel values based on the TU pixel data.

Example 16 includes the device of any of Examples 1 to 15, wherein the determination that the chroma TU is available and that the luma TU is unavailable is based on availability data that indicates whether TUs of the logical unit are available.

According to Example 17, a method includes determining, at a pixel processor, whether a luma transform unit (TU) from an entropy decoder is available, wherein a logical unit of an image frame includes at least the luma TU and at least a chroma TU; determining, at the pixel processor, whether the chroma TU from the entropy decoder is available; and based on a determination that the chroma TU is available and that the luma TU is unavailable, processing, at the pixel processor, the chroma TU to generate chroma pixel values of the logical unit prior to processing the luma TU to generate luma pixel values of the logical unit.

Example 18 includes the method of Example 17, and the method also includes processing, at the pixel processor, a first luma TU to generate first luma pixel values, wherein the logical unit includes the first luma TU and a second luma TU, and wherein the chroma TU is processed subsequent to processing the first luma TU at the pixel processor to generate the first luma pixel values and prior to processing the second luma TU at the pixel processor to generate second luma pixel values.

Example 19 includes the method of Example 17 or Example 18, wherein the image frame corresponds to a plurality of logical coding units (LCUs), each LCU of the plurality of LCUs includes two logical units, each logical unit of the two logical units includes at least a respective luma TU and at least a respective chroma TU, and one LCU of the plurality of LCUs includes the logical unit and another logical unit.

Example 20 includes the method of any of Examples 17 to 19, and further comprising performing, at the pixel processor, an inverse quantization operation based on quantized transform coefficients to generate dequantized transform coefficients, wherein a TU of the logical unit corresponds to quantized transform coefficients; performing, at the pixel processor, an inverse transform operation based on the dequantized transform coefficients to generate TU pixel data; and generating, at the pixel processor, TU pixel values based on the TU pixel data.

Example 21 includes the method of Example 20, and the method also includes receiving, via a modem, a bitstream including a representation of the TU; and processing, at the entropy decoder, the representation of the TU to generate the quantized transform coefficients.

Example 22 includes the method of Example 20 or Example 21, and the method also includes receiving, from a camera, a bitstream including a representation of the TU; and processing, at the entropy decoder, the representation of the TU to generate the quantized transform coefficients.

Example 23 includes the method of any of Examples 20 to 22, and the method also includes displaying, at a display device, at least a portion of the image frame that corresponds to the TU pixel values.

Example 24 includes the method of any of Examples 17 to 23, and the method also includes, in response to a determination that a TU of the logical unit has been output from the entropy decoder and has not been processed at the pixel processor, determining that the TU is available.

Example 25 includes the method of any of Examples 17 to 24, and the method also includes storing, in a memory, availability data of the logical unit, the availability data indicating whether TUs of the logical unit are available.

Example 26 includes the method of Example 25, and the method also includes, in response to receipt of a TU of the logical unit from the entropy decoder, updating the availability data to indicate that the TU has been output from the entropy decoder.

Example 27 includes the method of Example 25 or Example 26, and the method also includes, responsive to a determination that a TU of the logical unit has been processed at the pixel processor, updating the availability data to indicate that the TU has been processed at the pixel processor.

Example 28 includes the method of any of Examples 25 to 27, and the method also includes, based on a value of a received indicator of a TU of the logical unit, determining whether the TU has been output from the entropy decoder; and based on a value of a processed indicator of the TU, determining whether the TU has been processed at the pixel processor, wherein the availability data includes the received indicator and the processed indicator.

Example 29 includes the method of any of Examples 25 to 28, and the method also includes determining, based on the availability data, a processing order at the pixel processor of the TUs of the logical unit.

Example 30 includes the method of any of Examples 17 to 29, and the method also includes performing, at the pixel processor, an inverse quantization operation based on quantized transform coefficients to generate dequantized transform coefficients, wherein a TU of the logical unit corresponds to the quantized transform coefficients; performing, at the pixel processor, an inverse transform based on the dequantized transform coefficients to generate TU pixel data; and generating, at the pixel processor, TU pixel values based on the TU pixel data.

Example 31 includes the method of any of Examples 17 to 30, wherein the determination that the chroma TU is available and that the luma TU is unavailable is based on availability data that indicates whether TUs of the logical unit are available.

According to Example 32, a non-transitory computer-readable medium stores instructions that, when executed by one or more processors, cause the one or more processors to determine, at a pixel processor, whether a luma transform unit (TU) from an entropy decoder is available, wherein a logical unit of an image frame includes at least the luma TU and at least a chroma TU; determine, at the pixel processor, whether the chroma TU from the entropy decoder is available; and based on a determination that the chroma TU is available and that the luma TU is unavailable, process, at the pixel processor, the chroma TU to generate chroma pixel values of the logical unit prior to processing the luma TU to generate luma pixel values of the logical unit.

Example 33 includes the non-transitory computer-readable medium of Example 32, wherein the instructions, when executed by the one or more processors, cause the one or more processors to reconstruct a portion of the image frame based at least in part on a combination of the chroma pixel values and the luma pixel values.

According to Example 34, an apparatus includes means for determining whether a luma transform unit (TU) from an entropy decoder is available, wherein a logical unit of an image frame includes at least the luma TU and at least a chroma TU; means for determining whether the chroma TU from the entropy decoder is available; and means for processing the chroma TU to generate chroma pixel values of the logical unit prior to processing the luma TU to generate luma pixel values of the logical unit, the chroma TU processed based on a determination that the chroma TU is available and that the luma TU is unavailable.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store image data associated with a logical unit of an image frame, the logical unit including at least a luma transform unit (TU) and at least a chroma TU; and
one or more processors coupled to the memory, wherein the one or more processors are configured to:
determine, at a pixel processor, whether the luma TU from an entropy decoder is available;
determine, at the pixel processor, whether the chroma TU from the entropy decoder is available; and
based on a determination that the chroma TU is available and that the luma TU is unavailable, process, at the pixel processor, the chroma TU to generate chroma pixel values of the logical unit prior to processing the luma TU to generate luma pixel values of the logical unit.

2. The device of claim 1, wherein the at least one luma TU of the logical unit includes a first luma TU, and a second luma TU, and wherein the chroma TU is processed subsequent to the first luma TU being processed at the pixel processor to generate first luma pixel values and prior to the second luma TU being processed at the pixel processor to generate second luma pixel values.

3. The device of claim 1, wherein the image frame corresponds to a plurality of logical coding units (LCUs), each LCU of the plurality of LCUs includes two logical units, each logical unit of the two logical units includes at least a respective luma TU and at least a respective chroma TU, and one LCU of the plurality of LCUs includes the logical unit and another logical unit.

4. The device of claim 1, wherein a TU of the logical unit corresponds to quantized transform coefficients, and wherein the one or more processors are configured to:
perform, at the pixel processor, an inverse quantization operation based on the quantized transform coefficients to generate dequantized transform coefficients;
perform, at the pixel processor, an inverse transform operation based on the dequantized transform coefficients to generate TU pixel data; and generate, at the pixel processor, TU pixel values based on the TU pixel data.

5. The device of claim 4, further comprising:
a modem coupled to the one or more processors, the modem configured to receive a bitstream including a representation of the TU,
wherein the one or more processors are configured to process, at the entropy decoder, the representation of the TU to generate the quantized transform coefficients.

6. The device of claim 4, further comprising:
a camera coupled to the one or more processors, the camera configured to generate a bitstream including a representation of the TU,
wherein the one or more processors are configured to process, at the entropy decoder, the representation of the TU to generate the quantized transform coefficients.

7. The device of claim 4, further comprising a display device coupled to the one or more processors, the display device configured to display at least a portion of the image frame that corresponds to the TU pixel values.

8. The device of claim 1, wherein the one or more processors are configured to, in response to a determination that a TU of the logical unit has been output from the entropy decoder and has not been processed at the pixel processor, determine that the TU is available.

9. The device of claim 1, wherein the memory is configured to store availability data of the logical unit, the availability data indicating whether TUs of the logical unit are available.

10. The device of claim 9, wherein the one or more processors are configured to, in response to receipt of a TU of the logical unit from the entropy decoder, update the availability data to indicate that the TU has been output from the entropy decoder.

11. The device of claim 9, wherein the one or more processors are configured to, responsive to a determination that a TU of the logical unit has been processed at the pixel processor, update the availability data to indicate that the TU has been processed at the pixel processor.

12. The device of claim 9, wherein the availability data includes a received indicator and a processed indicator of a TU of the logical unit, and wherein the one or more processors are configured to:
based on a value of the received indicator, determine whether the TU has been output from the entropy decoder; and
based on a value of the processed indicator, determine whether the TU has been processed at the pixel processor.

13. The device of claim 9, wherein the one or more processors are configured to determine, based on the availability data, a processing order at the pixel processor of the TUs of the logical unit.

14. The device of claim 1, wherein the memory and the one or more processors are integrated into at least one of a mobile phone, a tablet computer device, a wearable electronic device, a camera device, a vehicle, or an extended reality device.

15. A method comprising:
determining, at a pixel processor, whether a luma transform unit (TU) from an entropy decoder is available, wherein a logical unit of an image frame includes at least the luma TU and at least a chroma TU;
determining, at the pixel processor, whether the chroma TU from the entropy decoder is available; and
based on a determination that the chroma TU is available and that the luma TU is unavailable, processing, at the pixel processor, the chroma TU to generate chroma pixel values of the logical unit prior to processing the luma TU to generate luma pixel values of the logical unit.

16. The method of claim 15, further comprising processing, at the pixel processor, a first luma TU to generate first luma pixel values, wherein the logical unit includes the first luma TU and a second luma TU, and wherein the chroma TU is processed subsequent to processing the first luma TU at the pixel processor to generate the first luma pixel values and prior to processing the second luma TU at the pixel processor to generate second luma pixel values.

17. The method of claim 15, further comprising:

performing, at the pixel processor, an inverse quantization operation based on quantized transform coefficients to generate dequantized transform coefficients, wherein a TU of the logical unit corresponds to the quantized transform coefficients;

performing, at the pixel processor, an inverse transform based on the dequantized transform coefficients to generate TU pixel data; and generating, at the pixel processor, TU pixel values based on the TU pixel data.

18. The method of claim 15, wherein the determination that the chroma TU is available and that the luma TU is unavailable is based on availability data that indicates whether TUs of the logical unit are available.

19. A non-transitory computer-readable medium storing instructions that, when executed by one or more processors, cause the one or more processors to:

determine, at a pixel processor, whether a luma transform unit (TU) from an entropy decoder is available, wherein a logical unit of an image frame includes at least the luma TU and at least a chroma TU;

determine, at the pixel processor, whether the chroma TU from the entropy decoder is available; and based on a determination that the chroma TU is available and that the luma TU is unavailable, process, at the pixel processor, the chroma TU to generate chroma pixel values of the logical unit prior to processing the luma TU to generate luma pixel values of the logical unit.

20. The non-transitory computer-readable medium of claim 19, wherein the instructions, when executed by the one or more processors, cause the one or more processors to reconstruct a portion of the image frame based at least in part on a combination of the chroma pixel values and the luma pixel values.

\* \* \* \* \*